United States Patent [19]

De'ath et al.

[11] Patent Number: 5,028,226
[45] Date of Patent: Jul. 2, 1991

[54] MULTI-CAVITY, CO-INJECTION MOLDING APPARATUS

[75] Inventors: Roderick M. De'ath, Wantage; Brian Fairchild, deceased, late of Haywards Heath, by Angela J. Fairchild, personal representative; Ian Flude, Wantage, all of United Kingdom

[73] Assignee: CMB Foodcan plc, Worcester, England

[21] Appl. No.: 523,260

[22] Filed: May 14, 1990

Related U.S. Application Data

[63] Continuation of Ser. No. 188,404, May 3, 1980, abandoned.

[30] Foreign Application Priority Data

Jul. 5, 1986 [GB] United Kingdom ................ 8616460

[51] Int. Cl.$^5$ .............................................. B29C 45/16
[52] U.S. Cl. .................... 425/130; 425/547; 425/559; 425/564; 425/572
[58] Field of Search ................... 264/40.5, 40.6, 40.7, 264/328.8, 328.14, 328.15, 328.16; 425/143, 144, 145, 130, 547, 548, 557, 559, 561, 564, 566, 131, 133.1, 562, 572, 588

[56] References Cited

U.S. PATENT DOCUMENTS

| | | | |
|---|---|---|---|
| 3,909,169 | 9/1975 | Barrie | 425/130 |
| 4,124,308 | 11/1978 | Sokolow | 264/328.19 |
| 4,717,324 | 1/1988 | Schad et al. | 425/549 |
| 4,781,954 | 11/1988 | Krishnakumar et al. | 264/328.8 |

FOREIGN PATENT DOCUMENTS

| | | |
|---|---|---|
| 125787 | 11/1984 | European Pat. Off. . |
| 2420806 | 11/1975 | Fed. Rep. of Germany ...... 425/130 |
| 1553319 | 1/1968 | France . |
| 00231 | 2/1981 | PCT Int'l Appl. . |

Primary Examiner—Jill L. Heitbrink
Attorney, Agent, or Firm—Christie, Parker & Hale

[57] ABSTRACT

An injection moulding apparatus (10) includes similar co-injection modules (12) each provided with common supplies (238-242) and supplied with different polymer materials at intermediate pressure by common plasticisers (14-18). Each module has a co-injection nozzle assembly (70) in wich each nozzle (148-154) is supplied with polymer at injection pressure by an injector (208) which receives polymer through a non-return valve (220). The injector is mounted alongside the nozzle on a polymer transfer plate (138-146), and has the position of its piston (212) controlled by a hydraulic actuator (214) under the control of a dedicated micro-processor (164) in accordance with a stored injection control program. Each polymer is injected by an injector (208) directly into the associated nozzle (148-154) and is controlled solely by injector operation, and without the use of any control valve between the injector and the nozzle. The module micro-processors are controlled by a host processor which organizes the operations of the apparatus.

12 Claims, 21 Drawing Sheets

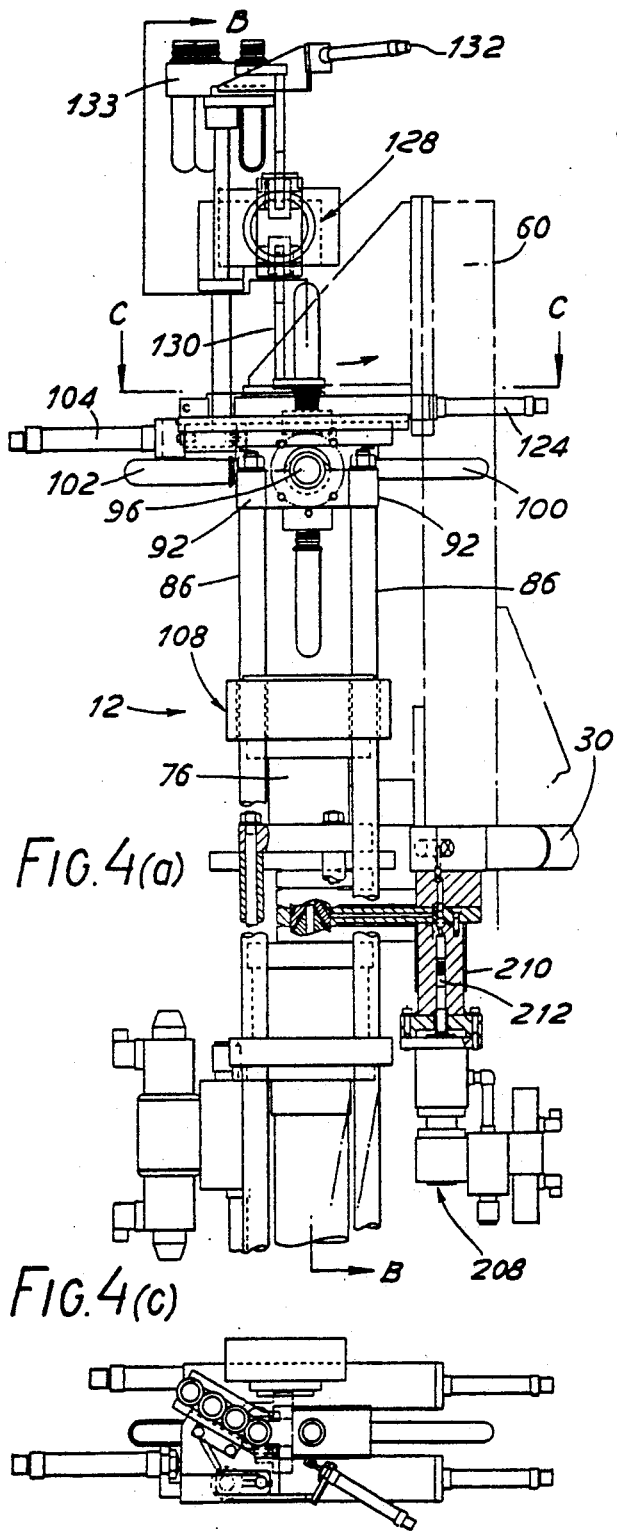

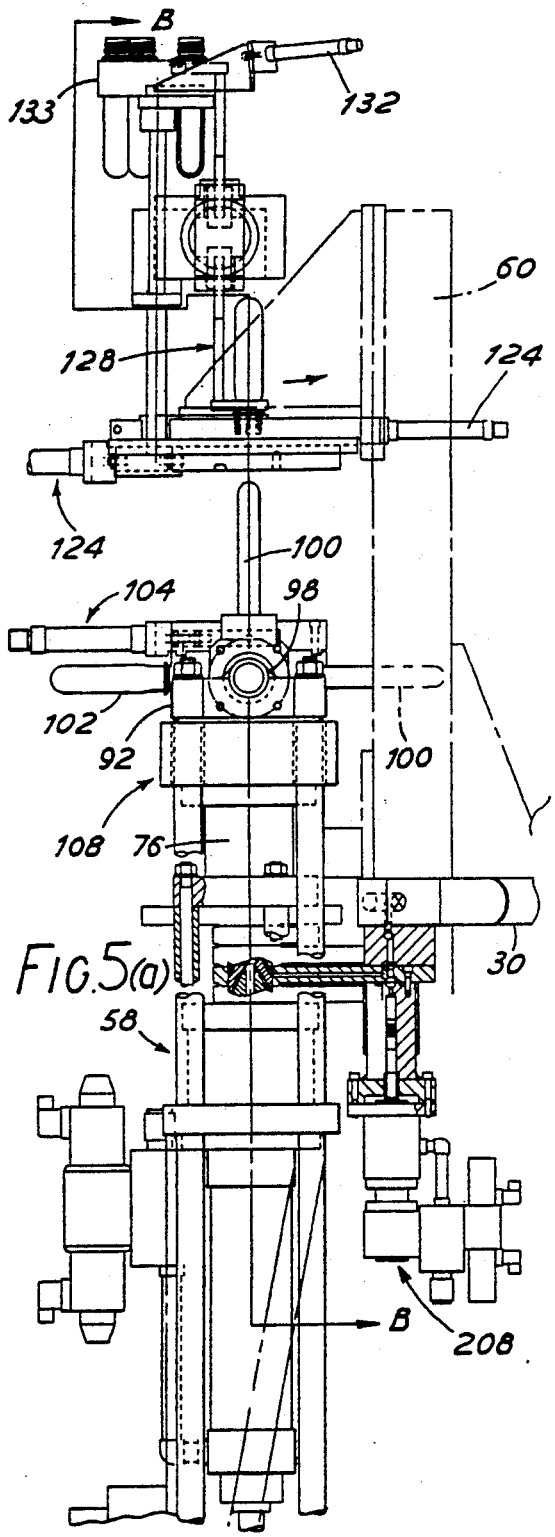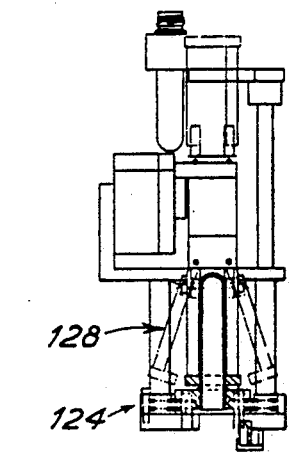
FIG.5(a)
FIG.5(b)

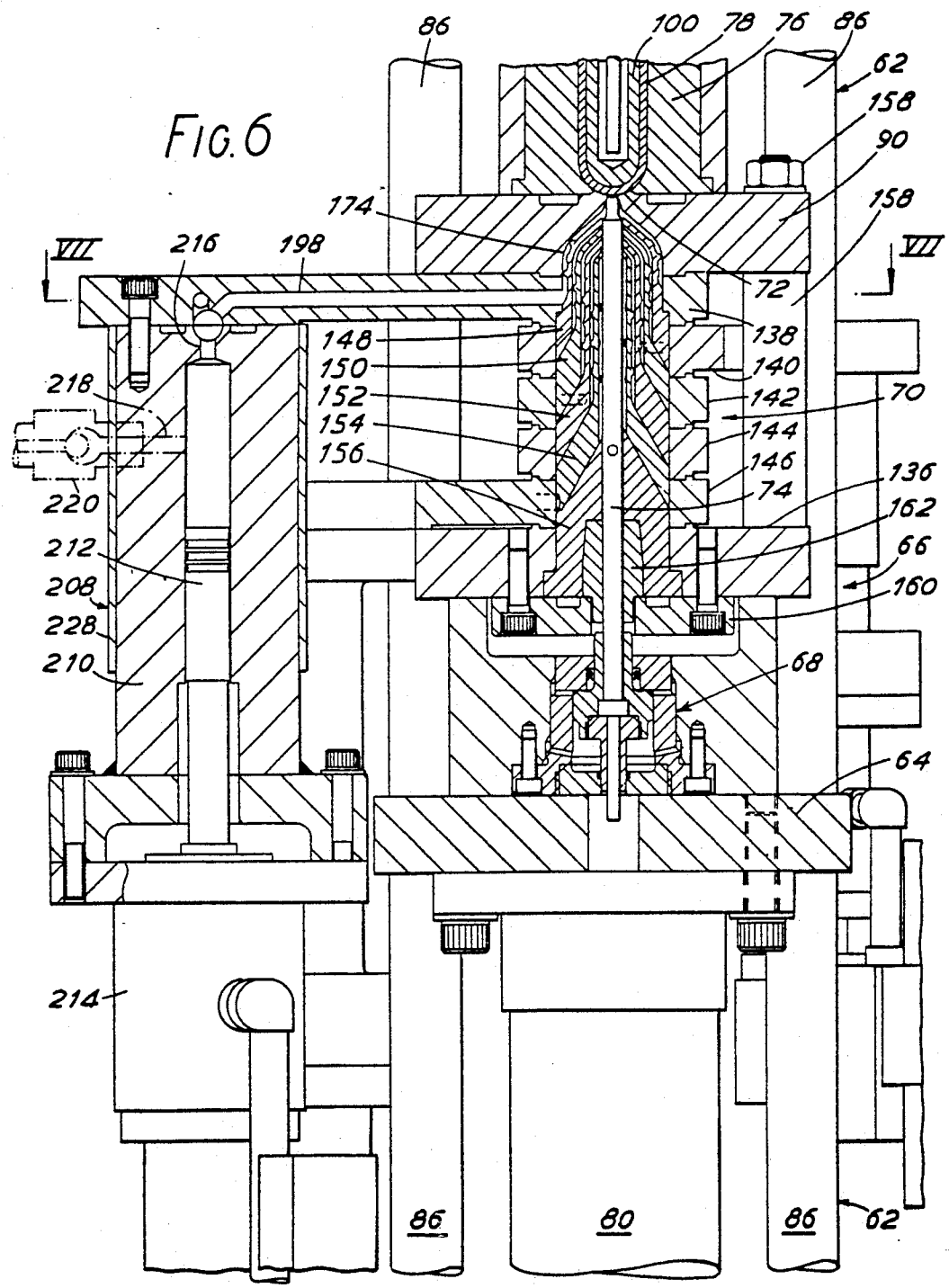

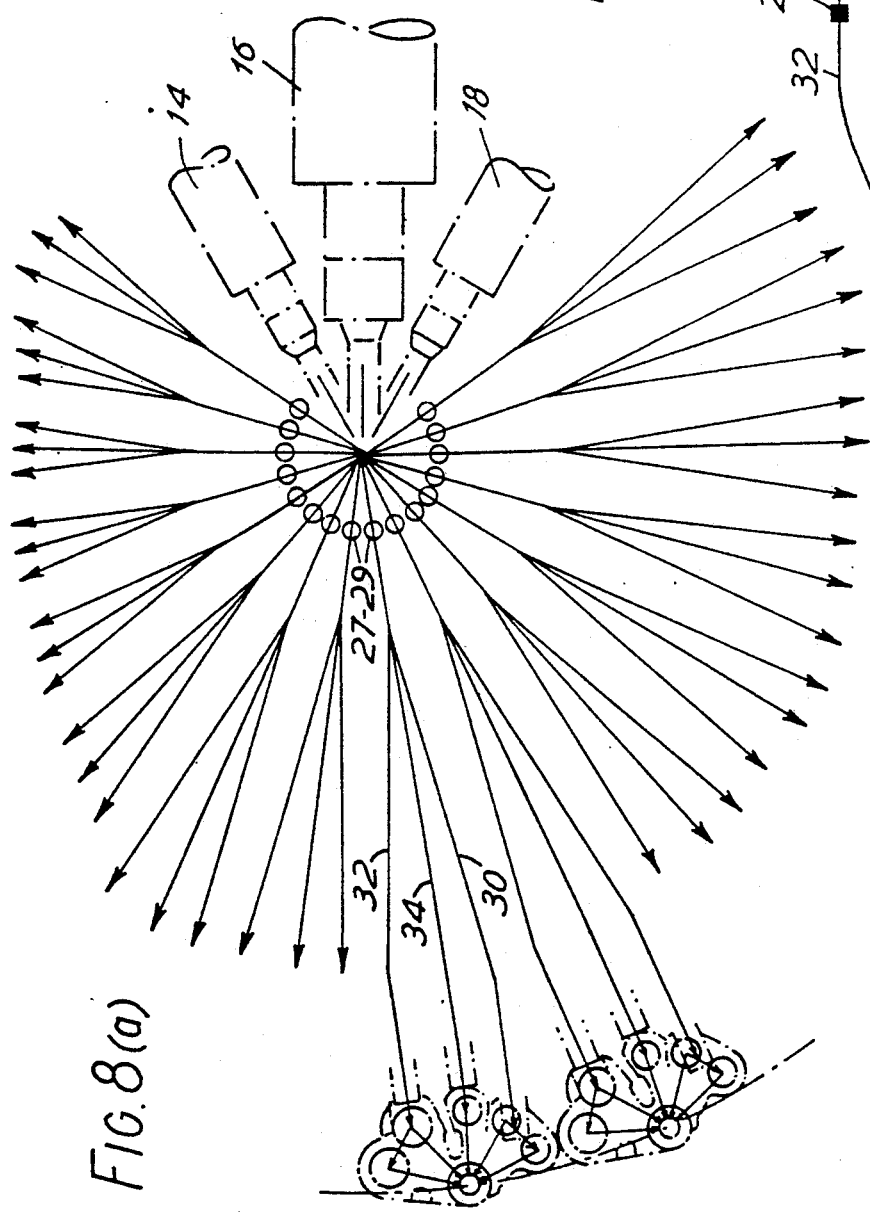
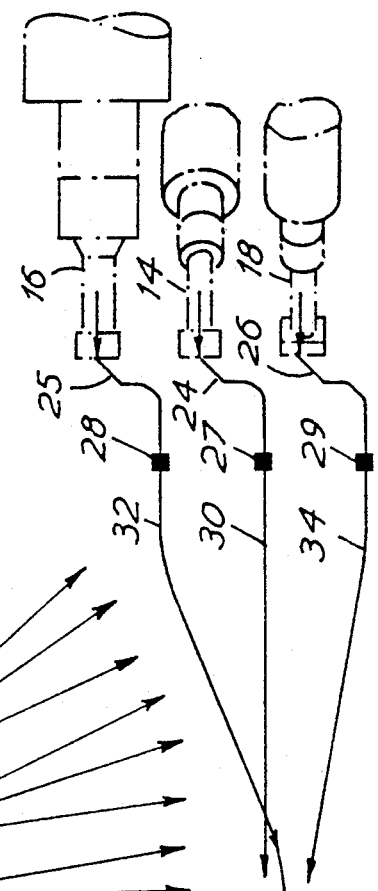
FIG.8(a)
FIG.8(b)

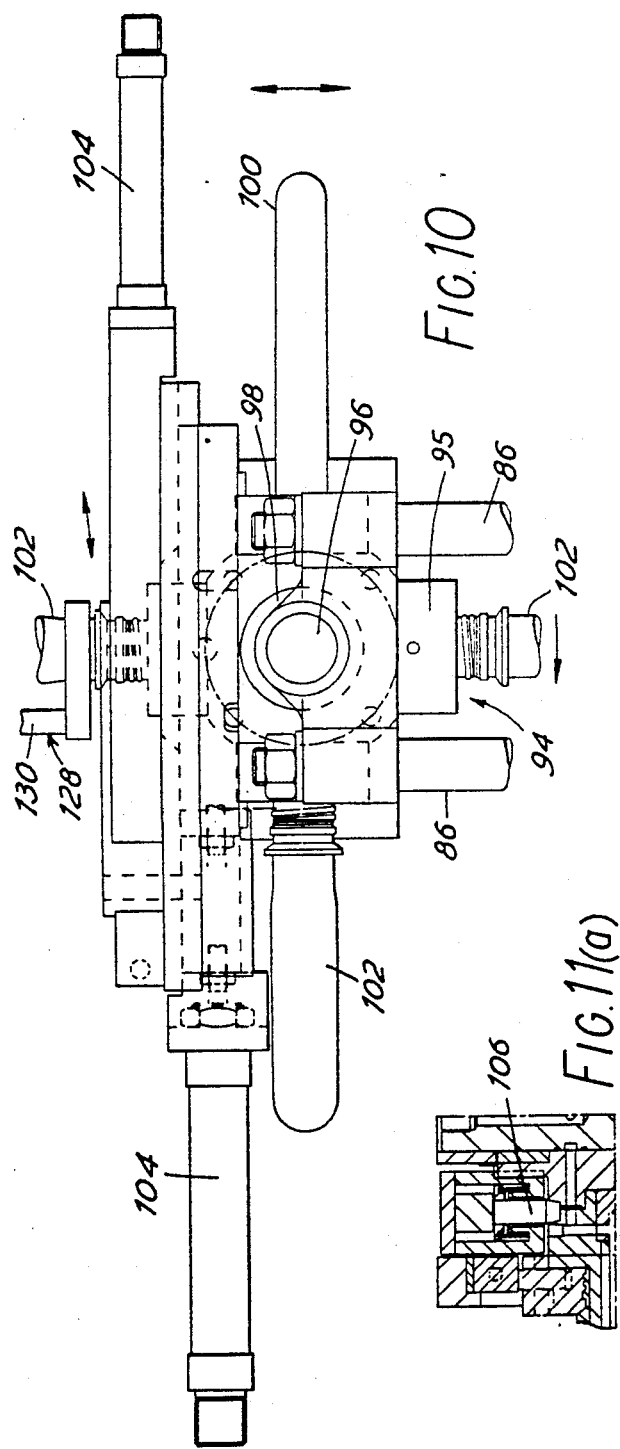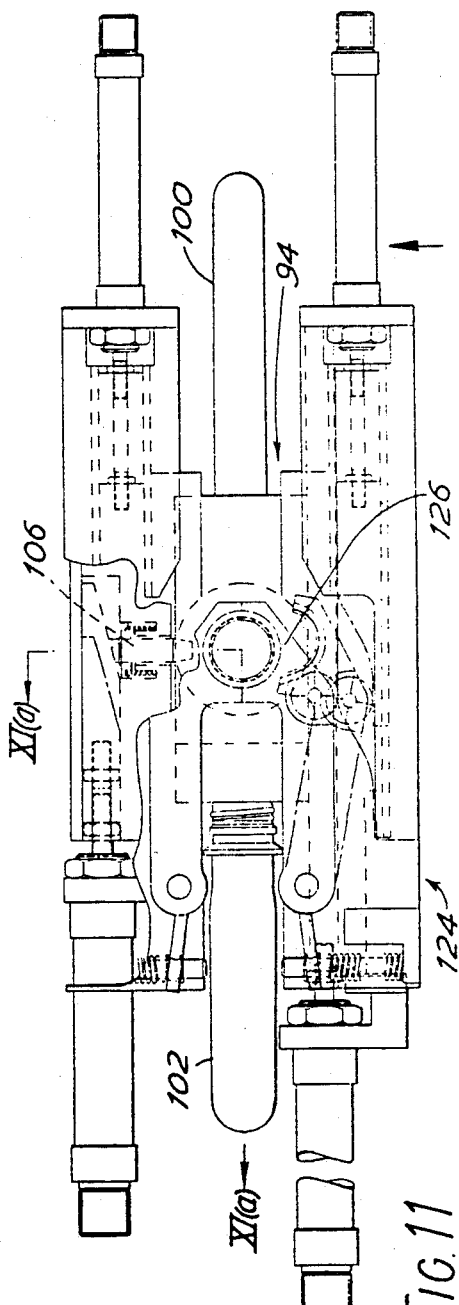

MULTI-CAVITY, CO-INJECTION MOLDING APPARATUS

CROSS-REFERENCE TO RELATED APPLICATIONS

This is a continuation of application Ser. No. 188,404, filed May 3, 1988, now abandoned.

TECHNICAL FIELD

This invention relates to the manufacture of articles, and particularly to apparatus and methods for manufacturing articles comprising one or more layers of polymeric material, by extruding a stream of polymeric material, or various streams of polymeric material (of which at least some of those streams are of different polymeric materials), and then leading the stream or streams to a plurality of injection nozzles for injection moulding the articles. Where the articles are of more than one layer, the layers may be formed by co-injection of the layers substantially simultaneously or in a continuous sequence.

By way of non-limiting example, such articles may comprise packaging containers, or else preforms for such containers (such as bottles), which preforms may be subsequently blow-moulded to form the containers.

BACKGROUND ART

If articles are to be produced in very high numbers, then a known "multi-cavity" moulding system employing current mono-material hot-runner distribution principles may be used. In such an arrangement, the output stream from each extruder (plasticiser) is fed by a respective injection unit under pressure, through a hot runner distribution system in which the stream is split so as to serve a plurality of co-injection nozzles. In such a multi-cavity system the exit point for each layer material at the nozzle needs to be separately valved. See Patent Publications EP 0125787 A2 (Kudert et al).

Such an arrangement results in extreme mechanical complexity. Moreover, when operating in a production line, such equipment requires long set-up times, and incurs high maintenance costs, all of which adversely affect the economics of the manufacturing operation.

A further disadvantage is tha the engineering design of the runner system erquires to be optimised for a specific number of cavities at a specific product size, and thus for a specific cavity spacing.

It is also conventional to cool the article in the mould, and then to remove it only after cooling.

DISCLOSURE OF THE INVENTION

The present invention proposes an apparatus and a method for manufacturing multi-layer injection moulded articles, such as preforms, by co-injection of up to seven (or even more) layers of hot molten polymer, supplied from a plurality of extruders (plasticisers), there being one extruder for each polymer material. Typically, there are five layers utilising three polymer materials.

Moulding is performed in a multiplicity of individual co-injection mould cavities, each associated with a simple co-injection nozzle. Each nozzle is supplied with a polymer materials through respective discrete runner systems, which in turn are fed through a discrete set of feed pipes, one from each extruder. The individual runner systems and the individual feed pipes have discrete temperature control means.

Injection is by a two-stage process in which the runner system is kept continuously charged by the extruders at an intermediate pressure, and in which each injection operation is performed by respective injection units (shooting pots) associated with the respective melt flow streams. Thus, for five melt flow streams per nozzle, there are five injection units per nozzle.

The injection units are mounted very close to the nozzle which they serve, so that the runner system to the nozzle is very short and simple. Where the flow from one extruder is to provide more than one layer of the product, the feed from the extruder is split in the runner system immediately upstream of the injection units. All polymer passageways are discretely temperature controlled up to the point of combination in the nozzle.

Each nozzle and its associated runner system, injection units, mould cavity, and mould core and preform handling systems together form a discrete, self-contained module. Any number of such modules may be arranged around a distribution manifold at the delivery end of the extruders. Appropriate micro-processor controlled servo systems control the action of the injection units and the other moving parts of the module.

Each nozzle is of generally-known construction, being built up of concentric shells defining a central channel and a series of concentric annular channels with conical exit sections opening into a central exit throat into which they are gated by a simple servo-operated needle valve.

Mould cores are introduced into each mould cavity by a dedicated turnover device. That device transfer each newly-moulded hot preform (or other product) in turn from the mould cavity, and holds it for air cooling during the next moulding cycle, whereafter it presents the cooled preform to a stripper unit for stripping there from the core. In this way, the manufacturing cycle is split into successive moulding and extra-mould cooling stages.

An important distinction of the present invention over the prior art lies in the fact that the close proximity of the injection units to the co-injection nozzle, and the provision of an injection control programme directed solely to the conrol of that module, renders it unnecessary to employ valves adjacent the co-injection nozzle for the respective hot melt streams.

Substantial reductions in the overall cycle time can be achieved by removing the hot newly-moulded product from the injection cavity at the earliest time after injection, and then cooling it away from the mould, ('Split Cycle' moulding). However, handling of the product during removal from the mould and transfer to the cooling area must be precisely controlled, and cooling must be effected in such a way as to maintain dimensional stability and achieve negligible distortion.

The multi-module arrangement of the present invention diminishes many of the potential problems attendant upon the prior art arrangements, by using single (or at most double) cavity injection moulding technology, and eliminates many potential difficulties which are associated with the setting up and running of conventional (e.g. multi-cavity) equipment. The arrangement enables a simple hot runner to connect each mould station to a polymer source which is common to the modules, thus creating in each module an independently turnable module/runner system. In addition, the modular construction permits continuous machine operation during the maintenance or repair of a mould station, by isolating that station from the polymer supply and from the common services.

This modular concept permits any size of machine to be constructed from the same basic machine design. A sixteen module machine, for example, may be expanded to twenty-four or thirty-two modules to meet future production demands, by adding further modules (runner assemblies and control equipment) to the basic machine framework.

Thus, the machine can be easily sized to suit the production output required for a particular product or product range at any given time. Moreover, different products may be made in the respective modules of a machine at the same time.

Uniform product quality is readily achieved around the machine, (which is difficult to achieve with conventional multi-cavity 'balanced' hot runner systems). Although runner systems can be purchased in the market place today, significant development is normally necessary to 'tune' the system to individual product requirements.

In addition, such existing systems are relatively inflexible. A change in product or modifications to geometric detail may require additional expensive runner development. By way of contrast, a simpler runner design is suitable for the modular concept, and that design would hold good independently of changes in the product. Each mould cavity is independently tunable for optimum product quality.

Other features of the present invention will appear from a reading of the description that follows hereafter, and of the claims that are appended at the end of that description.

One apparatus and method, and various modifications thereof, all according to the present invention, will now be described by way of example and with reference to the accompanying diagrammatic drawings. That apparatus will be described as prepared for the production of, for example, preforms for conversion in a subsequent blow-forming, plastic bottle producing process. Such preforms comprise a layered construction in which a polymer barrier layer is sandwiched between inner and outer polymer skin layers, and in which the barrier and skin layers are secured together by interposed layers of a polymer adhesive.

BRIEF DESCRIPTION OF THE DRAWINGS

In the drawings:

FIGS. 4(a), (b), and (c) show respectively a side view, a sectional view taken on a section B-B of FIG. 4(a), and a plan view of one said co-injection module, when in a 'mould open' condition;

FIGS. 5(a) and (b) show views similar to those shown in the FIGS. 4(a) and (b) respectively, but with the co-injection module in the 'mould closed' condition;

FIG. 6 shows an enlargement of part of the FIG. 5(b), to reveal more clearly various details of an injection mould, an associated valved gate, an associated co-injection unit, and one of five associated injectors, all of which form part of the module;

FIG. 10 shows a side view of a turret incorporated in an upper part of a said module and carrying a series of cores for insertion in turn in the mould cavity of the module, FIG. 11 shows a plan view of a stripper device incorporated above said turret in a said module, some parts being shown torn away so as to reveal other parts below FIG. 11(a) is a cross-section of FIG. 11 showing the pneumatically operated locking means;

BEST MODES OF CARRYING OUT THE INVENTION

Figure 1:
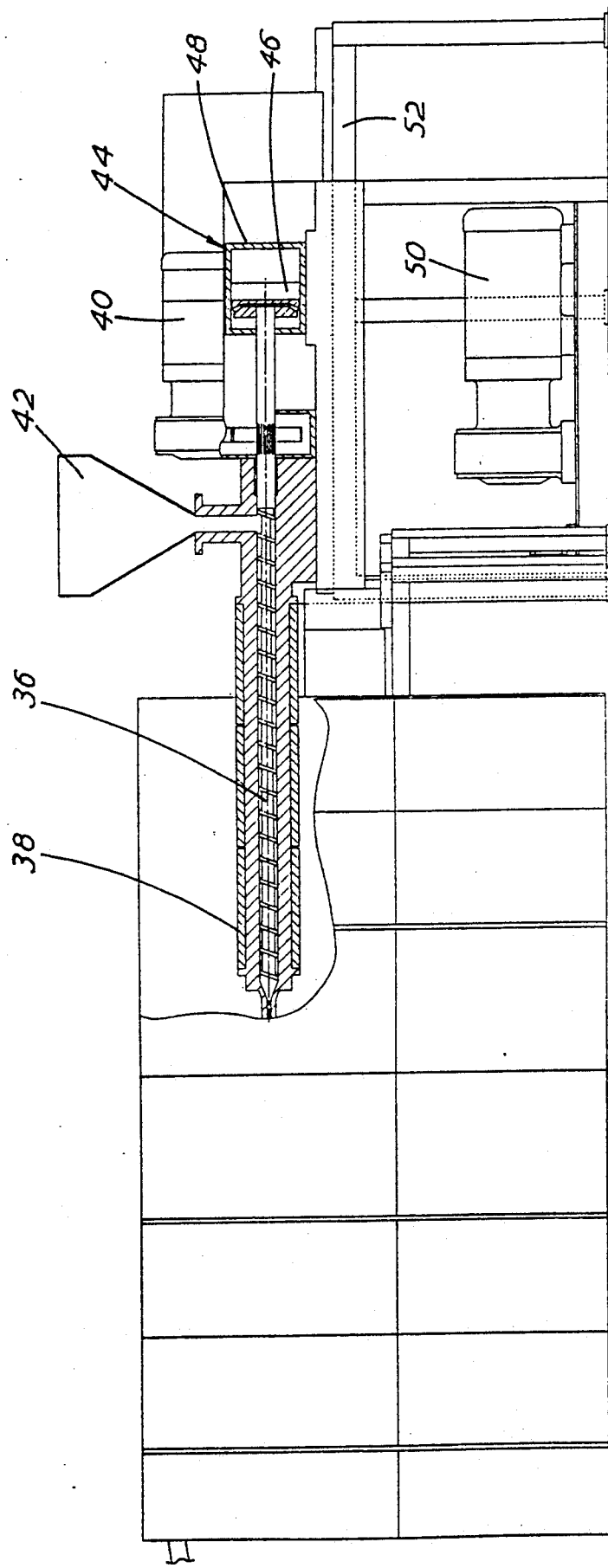
FIG. 1 shows a side elevation of the apparatus, with some parts removed and some parts sectioned so as to reveal details not otherwise to be seen.
Figure 2:
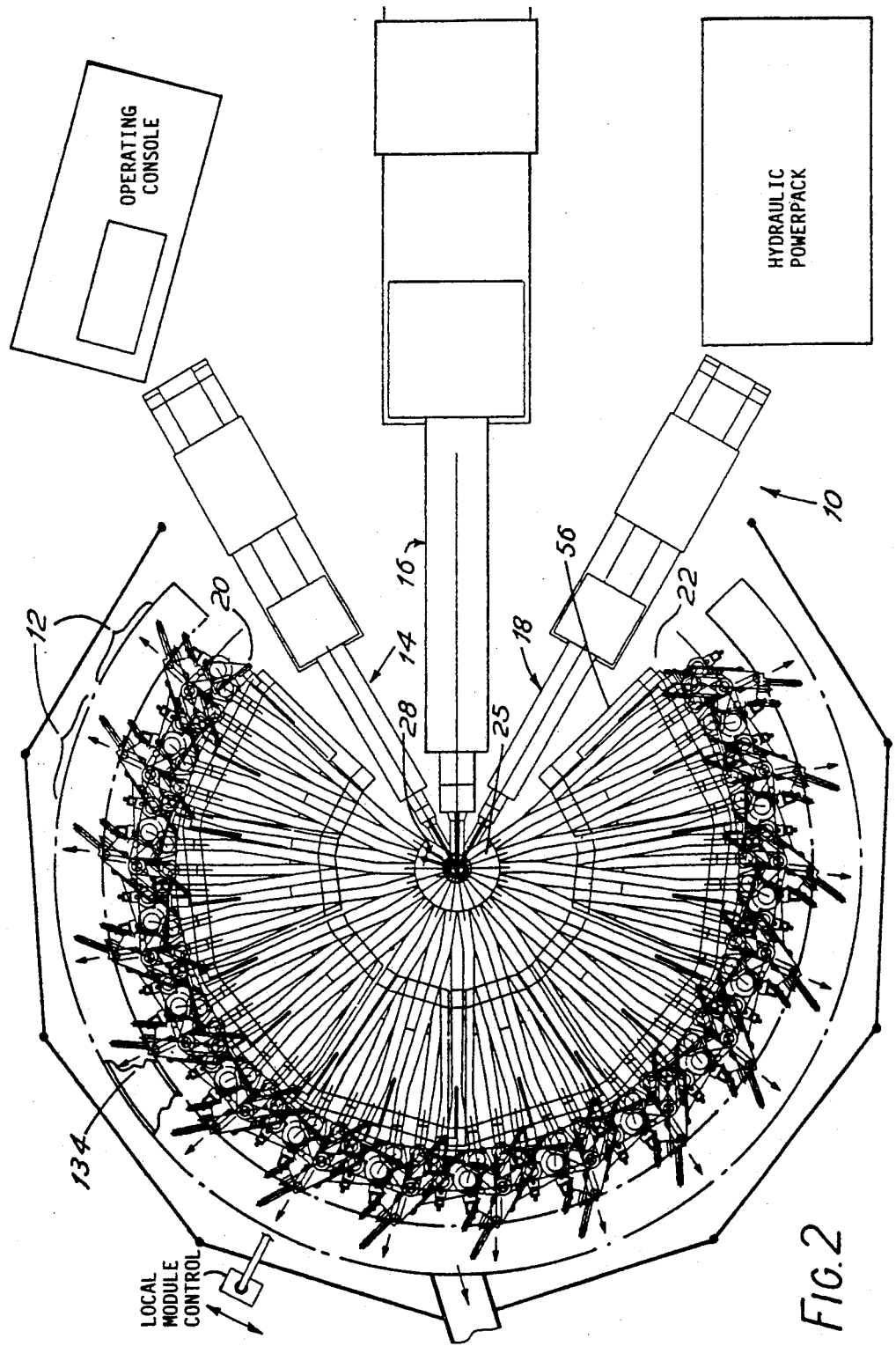
FIG. 2 shows a plan view of the apparatus with some parts removed for the sake of greater clarity.
Figure 3:
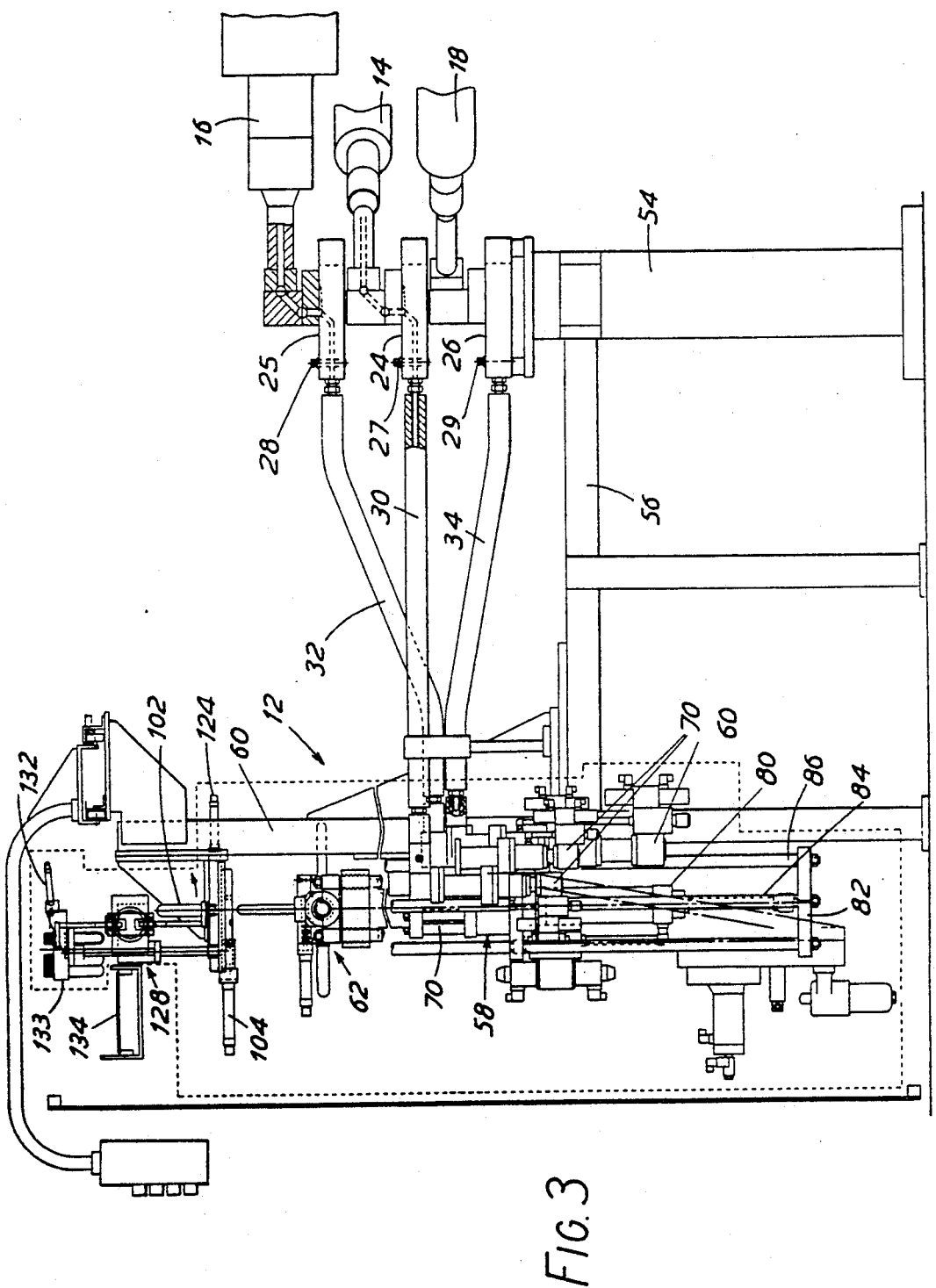
FIG. 3 shows, to a larger scale, a side elevation of one co-injection module incorporated in the apparatus, and parts common to that module and to a plurality of other similar modules for supplying hot polymer feedstock to the respective modules.
Figure 7:
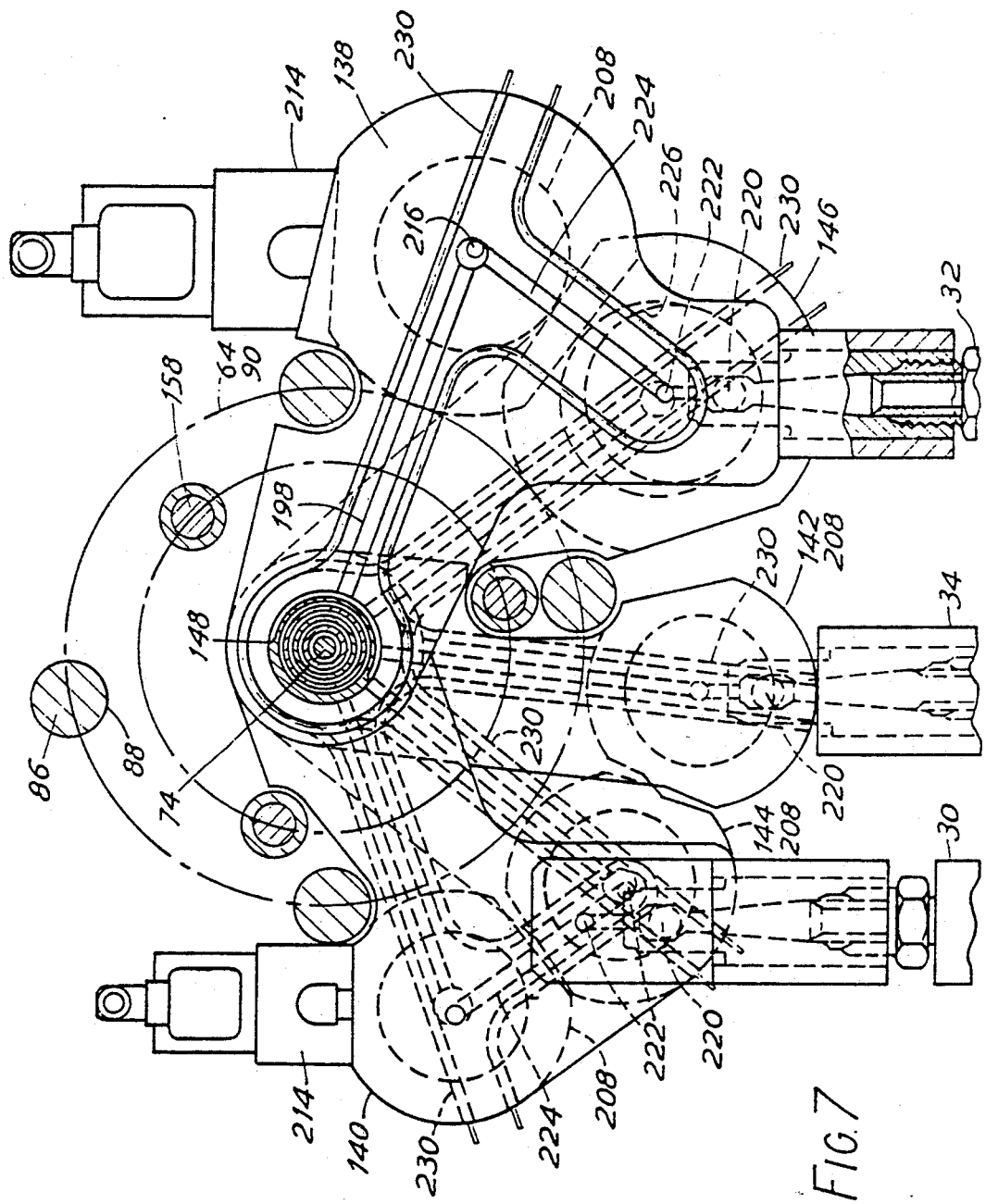
FIG. 7 shows a sectional view looking downwards on the transverse section VII—VII shown in the FIG. 6.
Figure 8C:
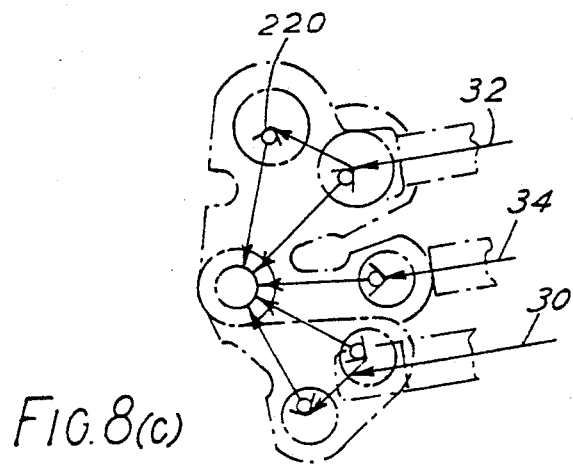
FIG. 8 shows schematically the manner in which hot polymer feedstock is distributed in the apparatus from a system of three common plasticisers to the respective co-injection modules, and to the five co-injectors incorporated in each such module, FIG. 8(a) showing the distributing system in plan view, FIG. 8(b) showing part of that distribution system in side view, FIG. 8(c) showing, to a larger scale, that part of the distribution system where it connects with the five co-injectors of one typical module, and FIG. 8(d) showing pictorially the part of the distribution system shown in FIG. 8(c)
Figure 8D:
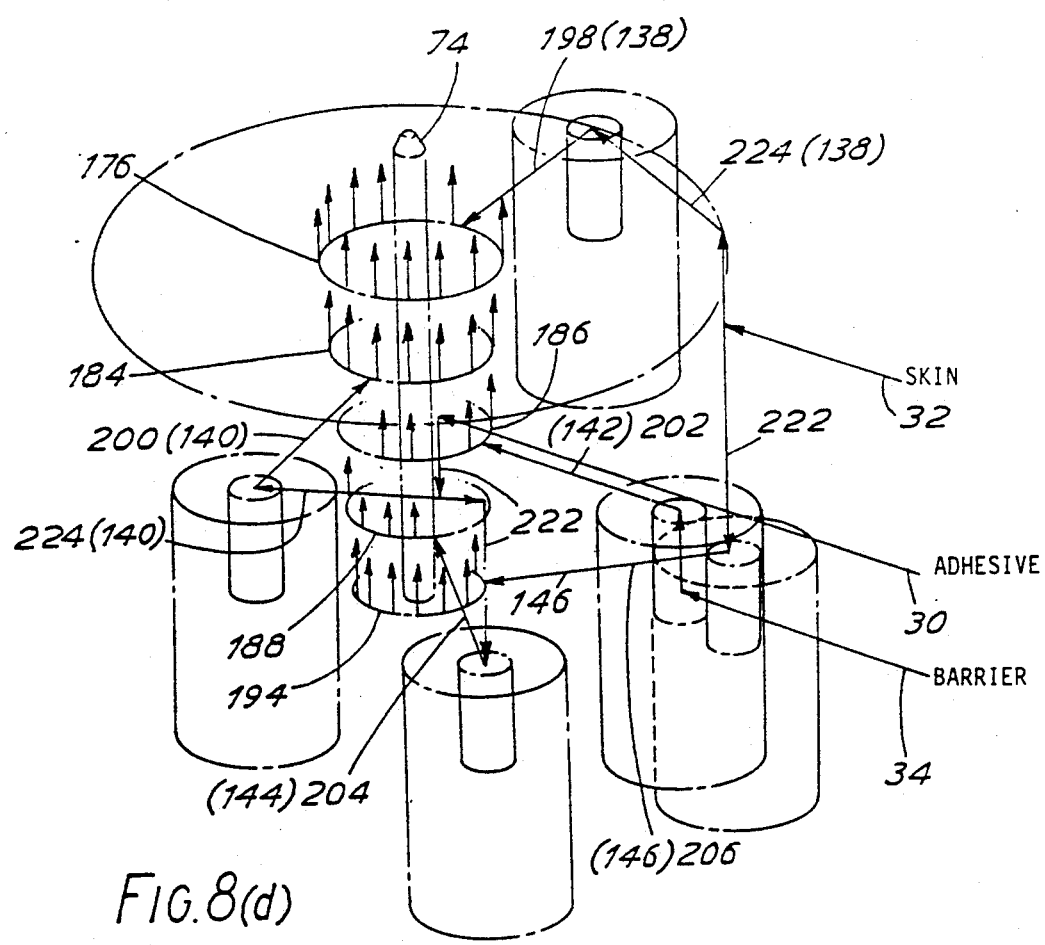
Figure 9:
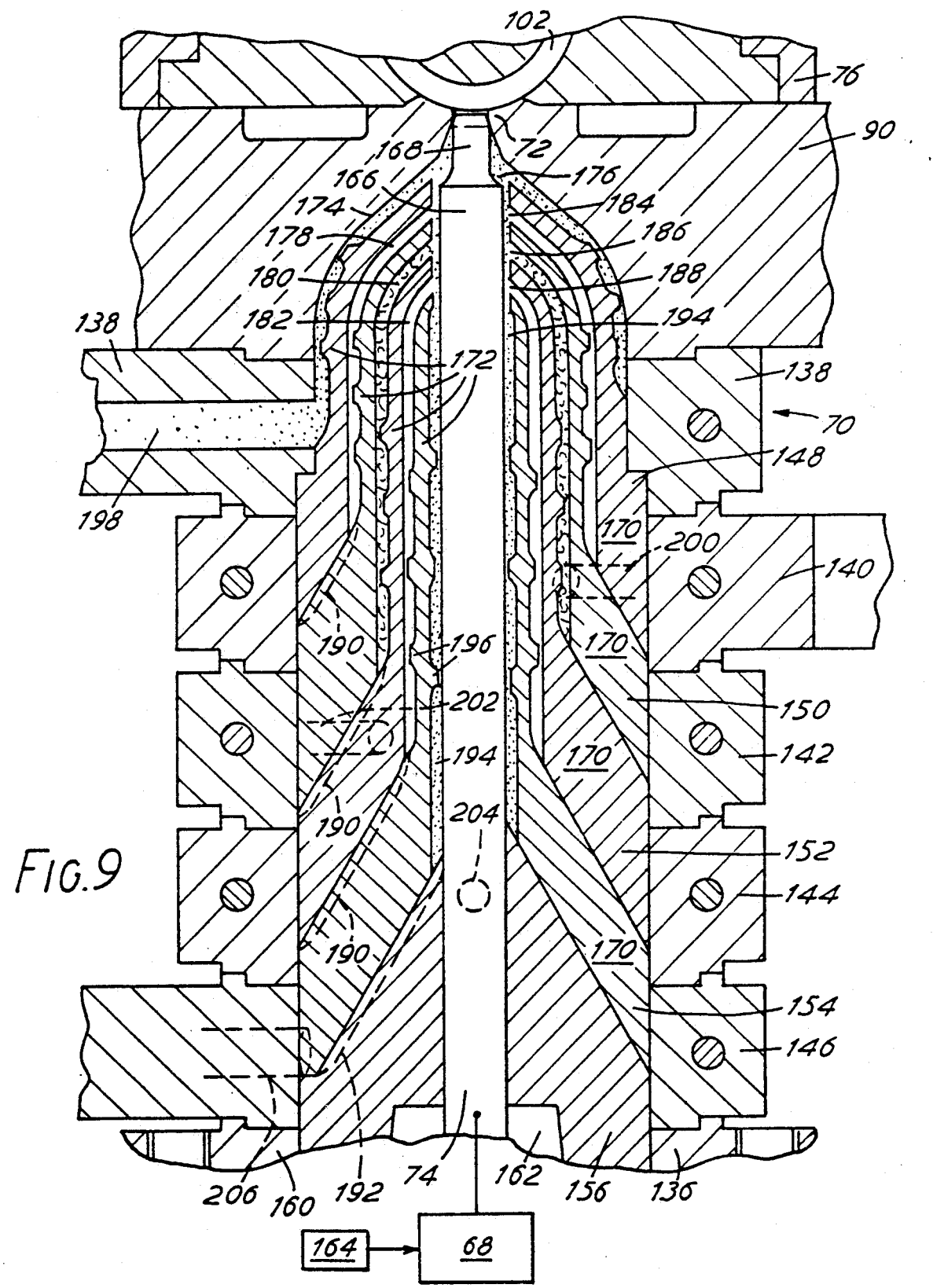
FIG. 9 shows a part of FIG. 6 to a larger scale, in which part there is shown a lower portion of a co-injection mould incorporated in one module, a co-injection valved gate associated with that mould, and parts making up a co-injection assembly associated with that gate.

Referring now to embodiment of FIGS. 1 to 10 of the drawings, and initially to the FIGs. 1–3, the apparatus 10 there shown includes sixteen similar co-injection modules 12 arranged side by side around approximately 270 degrees of an arc of a circle. Three conventional reciprocating screw type plasticisers (extruders) 14, 16, 18 are arranged radially in the space between the end modules 20, 22, and supply hot polymer feedstock to respective distribution manifolds 24, 25, 26 which are disposed one above the other at a central position. Those manifolds feed polymer to the respective modules through separate cut-off valves 27, 28, 29 and separate electrically heated supply pipes 30, 32, 34.

The respective plasticisers are sized according to the respective quantities of different polymer feedstocks to be supplied to the modules during the course of operation of the apparatus. The central plasticiser 16 supplies in this particular case the polymer for the inner and outer skin layers (i.e. the structural layers) of the article to be moulded; the plasticiser 14 supplies the polymer for the adhesive layers (i.e. the tie or bonding layers); and the plasticiser 18 supplies the polymer for the barrier layer.

Each plasticiser comprises an archimedean screw 36 arranged for rotation in an electrically heated tubular duct 38 by a separate variable speed hydraulic motor 40. Each such duct is provided at its input end with a hopper 42 for storing and delivering to the duct a granulated polymer feedstock, and is connected at its output end to the associated distribution manifold. Each screw 36 is biased towards the output end of its duct by an hydraulic biasing device 44 comprising a piston 46 and a cylinder 48, so as to enable the plasticiser to deliver hot molten polymer feedstock to the associated distribution manifold at a predermined intermediate pressure in the approximate range of 100–150 bar.

In each plasticiser the axial position of the screw 36 is monitored by a position sensing device (not shown) which is arranged to control the speed of the associated hydraulic driving motor 40 in dependence upon the axial position of the screw, and in a manner tending to maintain the desired output pressure in the associated distribution manifold despite variations in the rate at which hot polymer is drawn off from that manifold.

That sensing device acts to increase the driving motor speed whenever the screw advances towards the distribution manifold beyond a first predetermined position, on decrease in the output pressure, and to decrease the driving motor speed whenever the screw falls back, on increase in the output pressure, beyond a second predetermined position. Should the screw fall-back further with increased output pressure to a second fall back position, the sensing device effects a shut down of the driving motor, so that a fault situation can then be investigated and corrected.

An electrically driven hydrualic power pack 50 is mounted beneath the framework 52 on which the central plasticiser is mounted.

As shown in FIG. 3, the superposed distribution manifolds are mounted on a plinth 54, and around that plinth is a arcuate framework 56 against and on which the respective modules 12 are secured.

As shown in the FIGS. 4 to 6, each module 12 consists essentially of a fixed portion 58 which is carried on a module frame 60, and a movable portion 62 which is guided in said fixed portion for movement vertically relative thereto.

The fixed portion 58 includes on a transverse base member 64 a vertically stacked and secured assembly 66 comprising lowermost an hydraulically-operated gate valve actuator 68; above that a co-injection unit 70 which incorporates uppermost a gate valve orifice 72, and a central vertically-movable gate valve pin 74 which cooperates with the valve orifice 72 whereby to open and close that orifice; and above that unit a fixed, water-cooled; co-injection mould body 76 which defines a part of a mould cavity 78. The fixed portion also includes a hydraulically-operated, mould-clamping actuator cylinder 80 which is secured on the underside of the transverse base member 64.

The movable portion 62 of each module includes a transverse member or crosshead 82 which is carried at the lower end of a vertical piston rod 84 of the mould-clamping actuator 80; four vertical tie bars 86 which extend upwardly from that crosshead 82 through guides 88 formed in the transverse base member 64 and in the upper member 90 of the co-injection unit 70; a trunnion block 92 (see also FIG. 10) supported at the upper ends of those tie bars 86; and a rotatable turret 94 having its trunnions 96 rotatably mounted in aligned bearings 98 formed in that trunnion block.

The turret 94 carries on four equi-spaced radial arms 95 four water-cooled core members 100 which are arranged to cooperate in turn, on successively indexing the turret, with the mould body 76 and there further define the mould cavity 78 in which a polymer article 102 is to be injection moulded.

Pneumatically-operated indexing means 104 are provided on the movable portion 62 for indexing the turret during the later part of the ascent of that portion. Likewise, pneumatically-operated locking means 106 are provided on the movable portion 62 for locking the turret in its successive operative positions in readiness for insertion of one of its core members 100, on descent of the movable portion, into the part of the mould cavity 78 defined by the mould body 76. However, since the details of the turret and its associated mechanisms form no part of the present invention, no further description of them will be given here.

A movable, split mould assembly 108 is provided above the fixed mould body 76, and includes a movable carrier member 110 which is guided for vertical movement on the vertical tie bars 86. That movable carrier member 110 is normally spaced from the mould body 76 by spring-loaded mould separation pins 112 which are incorporated in the lower part of the movable member 110, and is provided with a central frusto-conical aperture 114 in the upper part of which is normally disposed a split mould 116.

That split mould comprises four separate similar mould segments 118 which are biased horizontally apart from one another by transverse compression springs 120. Those mould segments are retained in the frusto-conical aperture by a retaining rng 122, and have external surfaces which, when the mould segments are compressed transversely together by downwards movement, define a frusto-conical surface which matches that of the lower part of the aperture 114 with which they then mate. In that condition, the consolidated mould segments 118 define a continuation of the cavity formed in the mould body 76, the resultant cavity 78 being such as to mould the lipped articles 102 shown in the FIG. 10 on the lower and left hand cores 100 of the turret.

The movable carrier member 110 is forced down into contact with the fixed mould body 76 when a turret arm 95 moves down into contact with and depresses the split mould 116.

The module frame 60 also carries above the turret 94 a stripper device 124 (see FIG. 11) of conventional form and having a pair of pneumatically-operated jaws 126 which are intended to close on to the moulded article 102 when offered up to them in a vertical position by the turret 94, and to strip that article from the core member when the turret subsequently descends.

A pneumatically-operated turnover device 128 carried on the module frame above the stripper device 124 has a pair of pivotally suspended jaws 130 which are arranged to engage each moulded article held temporarily by the stripper device, and to rotate those jaws and the article gripped thereby so as to invert the article and present it to a pneumatically-operated pusher device 132. That device is arranged to push the inverted article along a cooling rail 133, whereby to cause it to fall eventually on to an arcuate collection conveyor 134 which lies around the upper periphery of the modules.

The co-injection unit 70 (see FIGS. 6 and 9) includes between upper and lower clamping plates 90, 136 a stack of five nested, polymer-transfer plates 138-146 which encircle in a fluid tight manner a stack of four nested tubular nozzle elements 148-154 and a conical pressure plug 156. Clamping studs and nuts 158 interconnect the two clamping plates and hold the components sandwiched therebetween in a state of high compression. The pressure plug 156 is secured in the lower clamping plate 136 by a retaining ring 160, and houses a guide bush 162 in which the valve pin 74 is slidably carried.

The valve pin is connected directly to the valve actuator 68 which is arranged to control, by closed loop means, the position of the valve pin in accordance with an electrical position signal supplied to the actuator by a micro-processor 164. That micro-processor is dedicated to the control of the various operations to be performed by the particular module.

The valve pin 74 comprises a cylindrical shank portion 166 which is surmounted at its upper end by a plug portion 168. When the valve pin is in its upper 'closed' position, that plug portion closes the gate orifice 72 in a fluid tight manner.

Each of the four nozzle elements 148-154 comprises a lower conical shell portion 170 from which a cylindrical nose portion 172 extends upwardly and closes around the shank portion of the valve pin 74 with radal clearance. The uppermost nozzle element 148 projects into and cooperates with a frusto-conical flow duct 174, formed in the upper clamping plate (or gate pad) 90 beneath the valve orifice 72, so as to form a first annular port 176 which is closed off by the valve pin when in its closed position.

The respective nose portions of the nozzle elements 148-154 are spaced radially from one another, and are of successively shorter axial lengths, so taht they define between them three concentric annular flow passages 178-182 which communicate with three axially-spaced annular ports 184-188 which open on to and are substantially closed off by the shank portion 166 of the valve pin when in its closed position. The radial clearance between the shank portion 166 and the said nose portions 172 amounts to ½ mm, or more as required.

The outer conical surface of each such nozzle element has formed therein a flow passage 190 which in the assembled nozzle unit communicates with the annular flow passage defined between that nozzle element and the next higher element.

The external conical surafce of the conical plug 156 has formed therein a flow passage 192 which in the assembled nozzle unit communicates with an annular flow passage 194 which lies between the adjacent nozzle element 154 and the valve pin 74 and which is substantially closed off by the nose portion of that nozzle element 154.

The concentric passages 174, 178-182, 194, have formed therein various choke ridges 196 by means of which the flow through the respective passageways may be balanced in a desired manner.

It will be appreciated that withdrawal of the valve pin 74 from its upper 'closed' position first opens the valve gate orifice 72, and then uncovers in succession the respective annular orifices which communicate with the respective concentric passageways 178-182, 194.

The respective polymer transfer plates 138-146 have radial transfer ducts 198-206 which communicate with the respective flow passages 190, 192 formed on the respective conical surfaces of the the nozzle elements 148-154 and plug 156.

Each such transfer plate (see FIG. 6) carries as close as possible to the nozzle assembly an injector 208 which includes a cylinder 210 bolted at its upper end to the transfer plate, and a piston (ram) 212 which is formed integrally with and is operated by an hydraulic actuator 214. That actuator includes a closed loop 'position' control means for controlling the position of the injector piston 212 strictly in accordance with an electrical position-reference signal which is supplied to it by the module micro-processor 164.

Each such injector 208 has uppermost a vertical outlet duct 216 which communicates with the radial transfer duct 198-206 of the associated transfer plate 138-146, and a sideways inlet duct 218 (indicated out of position in the FIG. 6) which communicates with the outlet of a ball type non-return valve 220 which is fitted immediately adjacent the injector. The inlet end of the ball valve communicate with the outlet end of the associated polymer supply pipe 30-34.

The polymer supply pipe 34, which supplies the barrier layer polymer, is connected to the ball valve of the injector which is associated with the middle transfer plate 142.

In contrast, the polymer supply pipe 32, which supplies the skin layer polymer, is connected in parallel to the ball valves of the respective injectors which are associated with the top and bottom transfer plates 138 and 146.

Likewise, the polymer supply pipe 30, which supplies the adhesive layers between the adjacent skin and barrier layers, is connected in parallel to the ball valves of the respective injectors which are associated with the second and fourth transfer plates 140 and 144.

The parallel connections for feeding the same polymer to two associated injectors are made by way of inter-connecting vertical ducts 222 and transverse ducts 224, the vertical ducts being formed in vertical columns 226 which inter-connect extensions of the respective transfer plates, and the transverse ducts being formed in those extensions of the transfer plates.

Each injector and its associated polymer flow duct system is provided whenever possible with electrically heated jackets 228 so as to maintain the polymer passing therethrough at the desired temperature. Each transfer plate is provided, for the same reason, with an electrical heater 230 embedded in the plate beneath a cover plate (not shown).

Figure 12:
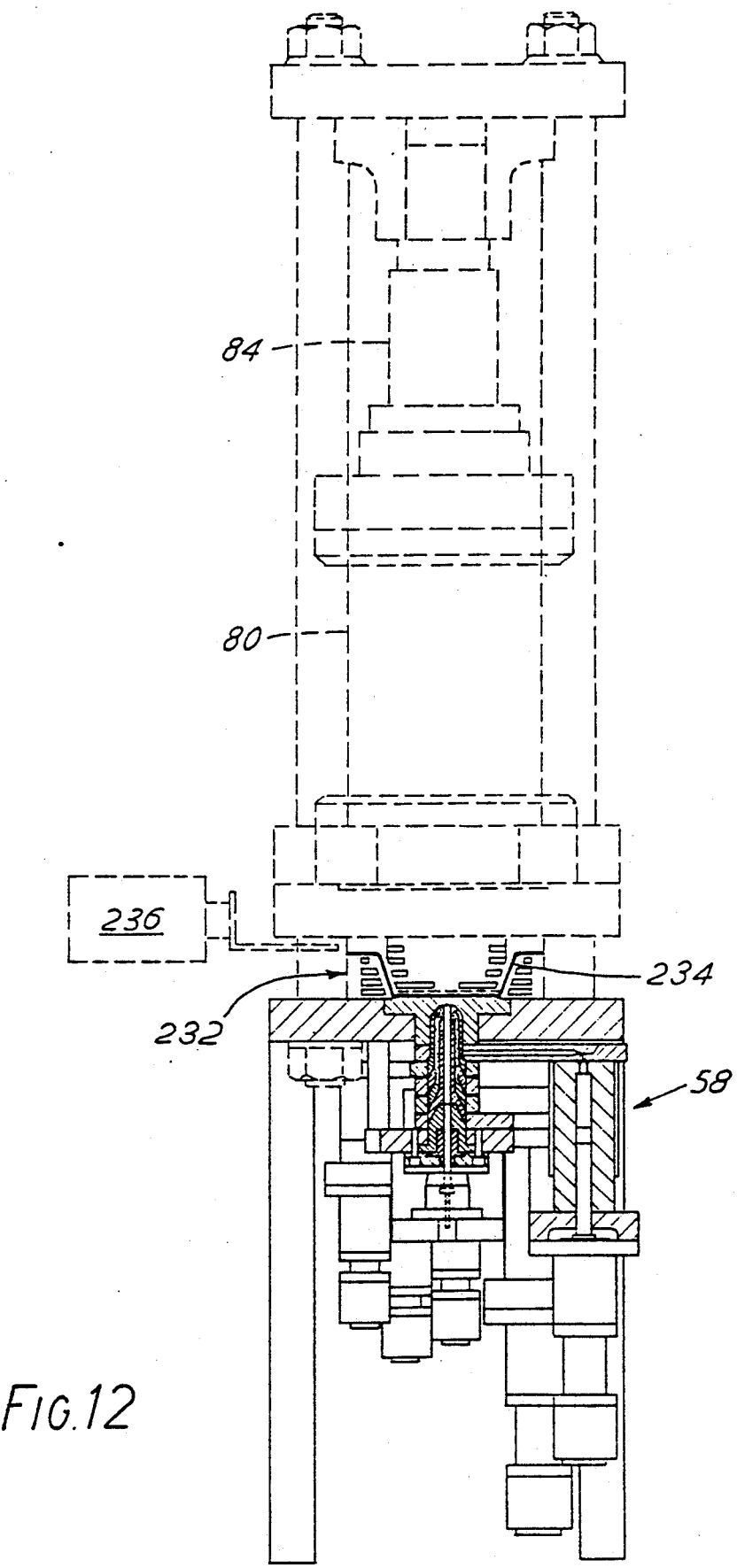
FIG. 12 shows, in a side view, an upper part of an alternative form of co-injection module having a different form of co-injection mould and mould clamping arrangement.

FIG. 12 shows a modified module in which a different form of mould 232 is employed for moulding thin-walled, shallow trays 234. Such trays require a simpler form of product handling apparatus 236, so that it is possible in such a case to mount the hydraulic mould clamping actuator 80, 84 above the mould parts 232 and to invert the mode of operation of that actuator. The moulded trays are stripped vertically from the mould, and are then removed in a horizontal sideways direction.

Figure 13:
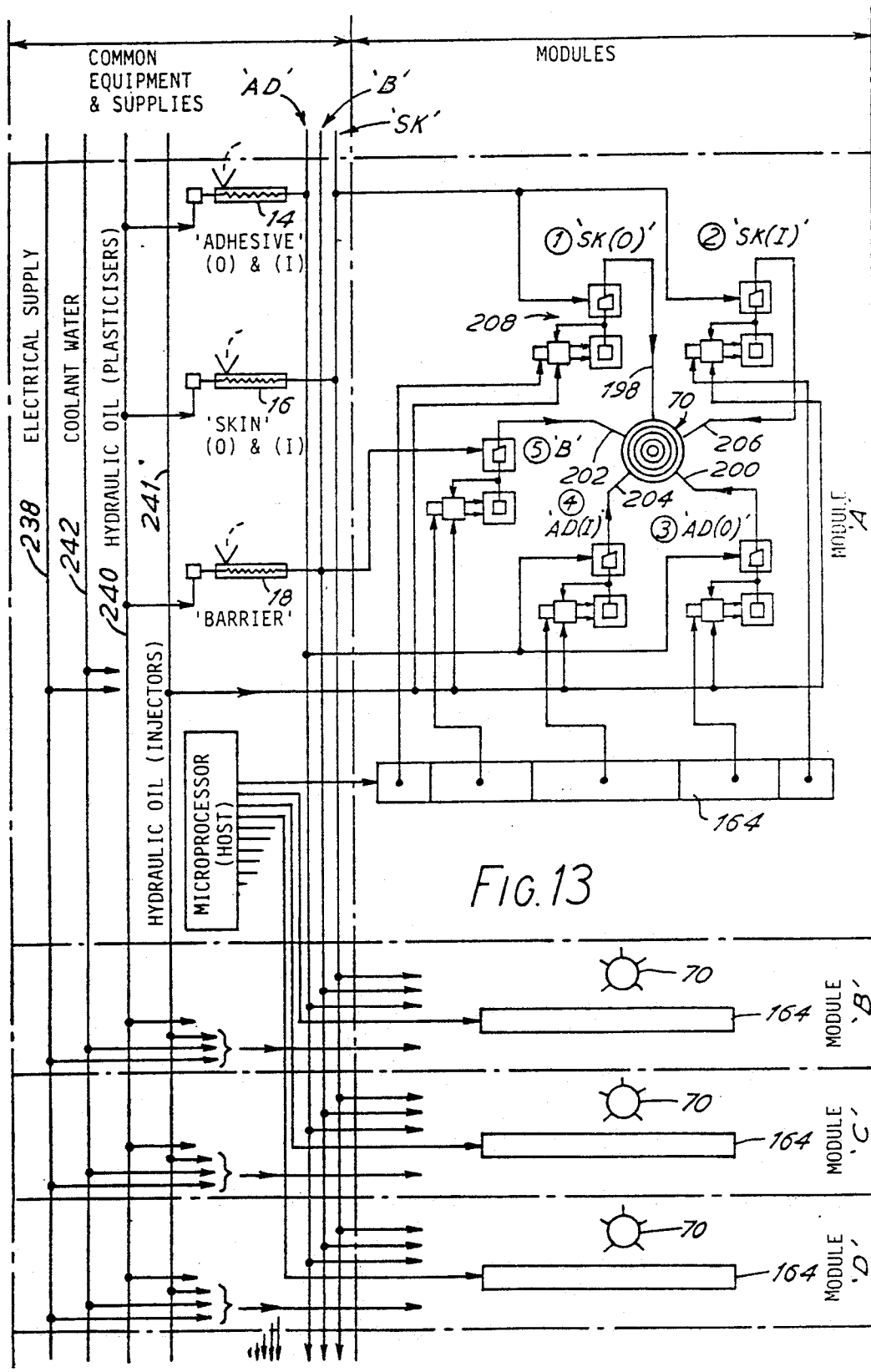
FIG. 13 shows a diagrammatic representation of the various circuits and systems incorporated in the apparatus.

In the FIG. 13, the various components of one module only are shown in conjunction with the plasticisers and the supply circuits that are common to all of the respective modules. Those common supply circuits include (a) an electrical supply circuit 238 for feeding the various heating jackets and elements of those parts in the module which are to contain and/or convey hot polymer feedstock; (b) pressure fluid supply lines 240 and 241 for feeding fluid under pressure to the driving motors of the plasticisers and to the respective injectors of the module; and (c) a coolant fluid supply line 242 for supplying cooling water under pressure to the module coolant circuits which are provided in the mould bodies and in the core members carried by the turret.

The module moulding cycle is as follows:

With the mould parts 76, 108, 100 closed together by the hydraulic actuator 80, 84, and locked against opening (by hyraulic means not shown), the valve pin 74 is progressively withdrawn by its hydraulic actuator 68 from the sealing land of the gate valve orifice 72 to a fully withdrawn position, and then subsequently returned to its starting position, all in a precisely controlled manner, thereby allowing the respective polymer materials to flow from the respective annular passages 174-182, 194 in a predetermined sequence and to combine at the gate orifice and flow therethrough into the mould cavity 78 in the desired manner, as shown in the respective FIGS. 14-21.

In those Figures, the five injectors are labelled as follows:

Injector 1—the injector associated with the top transfer plate 138 and supplying through transfer duct 198 the outer skin layer material;

Injector 2—the injector associated with the bottom transfer plate 146 and supplying through transfer duct 206 the inner skin layer material;

Injector 3—the injector associated with the next-to-top transfer plate 140 and supplying through transfer duct 200 the outer layer adhesive or tie material;

Injector 4—the injector associated with the next-to-bottom transfer plate 144 and supplying through transfer duct 204 the inner layer adhesive or tie material; and Injector 5—the injector associated with the middle transfer plate 142 and supplying through transfer duct 202 the barrier layer material.

Figure 14:
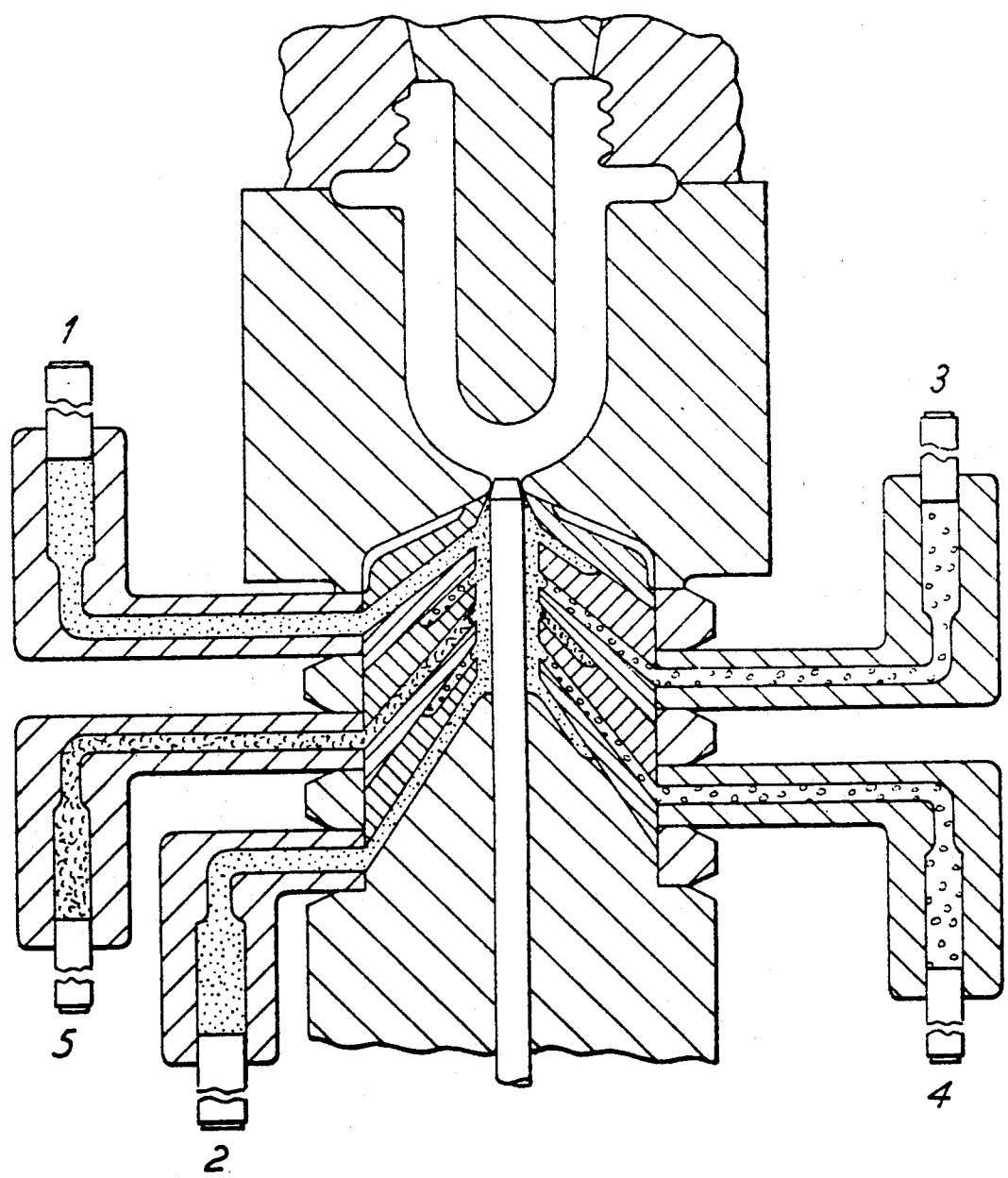
FIGS. 14 to 21 show respectively and diagrammatically different stages in a co-injection process that is carried on in a typical module of the apparatus to form a preform for subsequent use in a blow-forming, plastic bottle making process.

FIG. 14 shows the system state: MOULD CLOSED; in which the valve pin 74 is fully forward, the valve orifice 72 is closed, all of the injectors are fully charged with their pistons stationary in rearward positions, and the central annular duct (extending the length of the valve pin) is charged principally with inner skin material, and with a little outer skin material adjacent the upper end of the valve pin.

Figure 15:
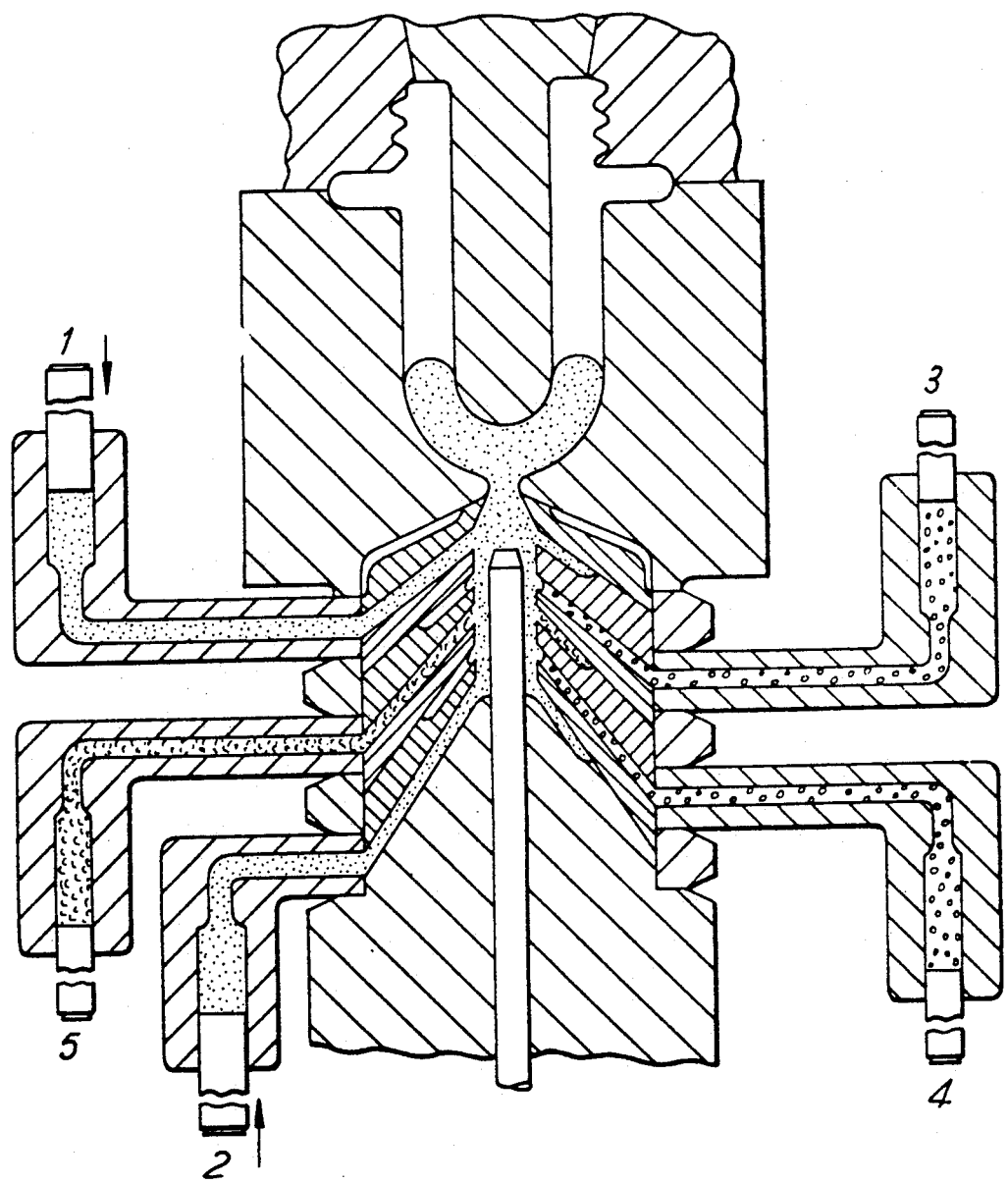

FIG. 15 shows the state: PRECHARGE SKIN; in which the valve pin 74 is partially withdrawn, the valve orifice 72 is open, and the injectors 2 and 1 have their pistons starting in succession (in that order) to move forward and inject inner and outer skin materials respectively into the mould cavity in the manner shown.

Figure 16:
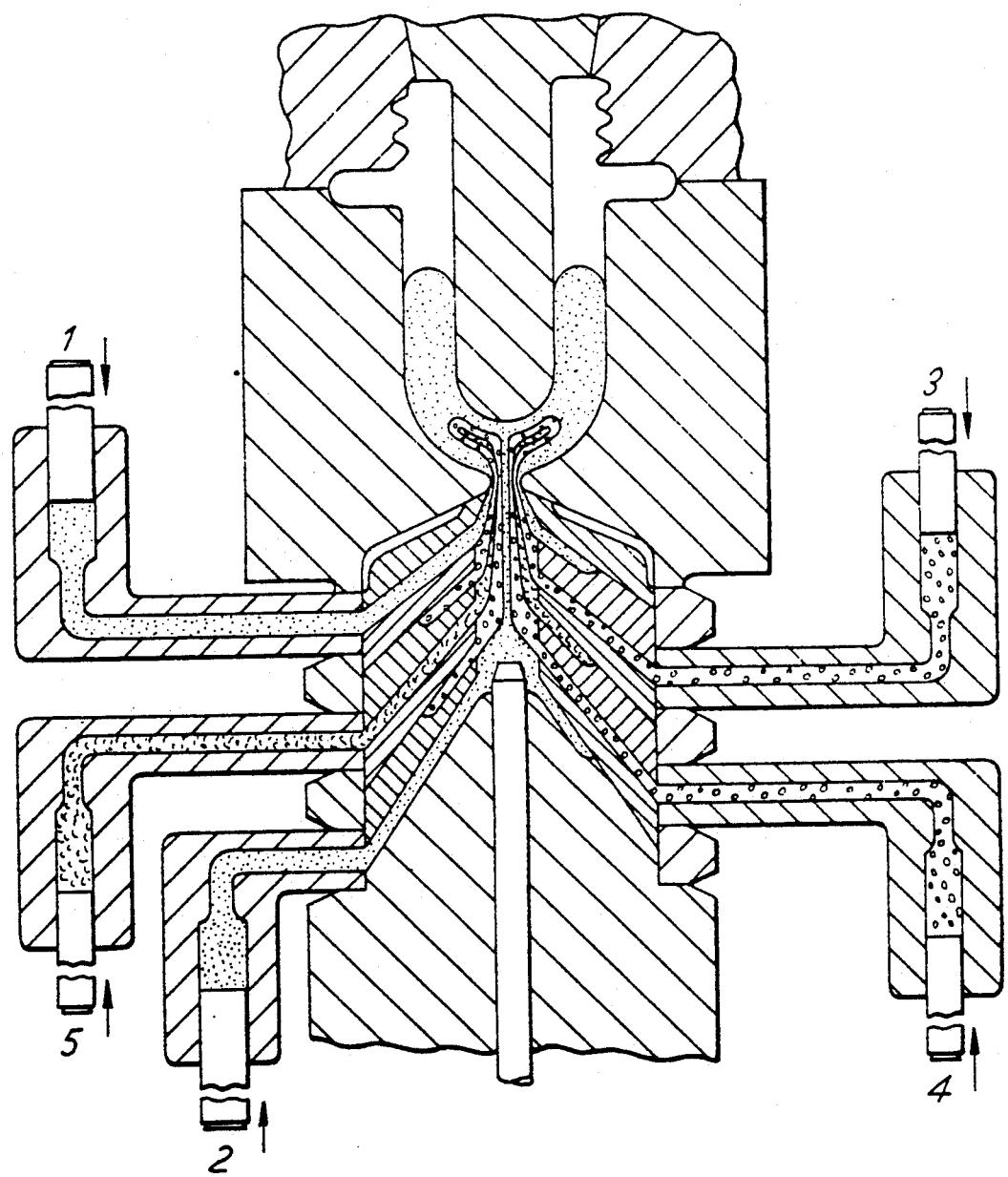

FIG. 16 shows the state: INTRODUCE TIE-BARRIER-TIE; in which the valve pin 74 is fully withdrawn, the valve orifice 72 is open, the pistons of the injectors 2 and 1 continue to move forward to inject further inner and outer skin materials into the mould cavity, and injectors 4, 5 and 3 have their pistons starting in succession (in that order) to move forward and inject inner tie, barrier and outer tie materials respectively into the mould cavity in the manner shown.

Figure 17:
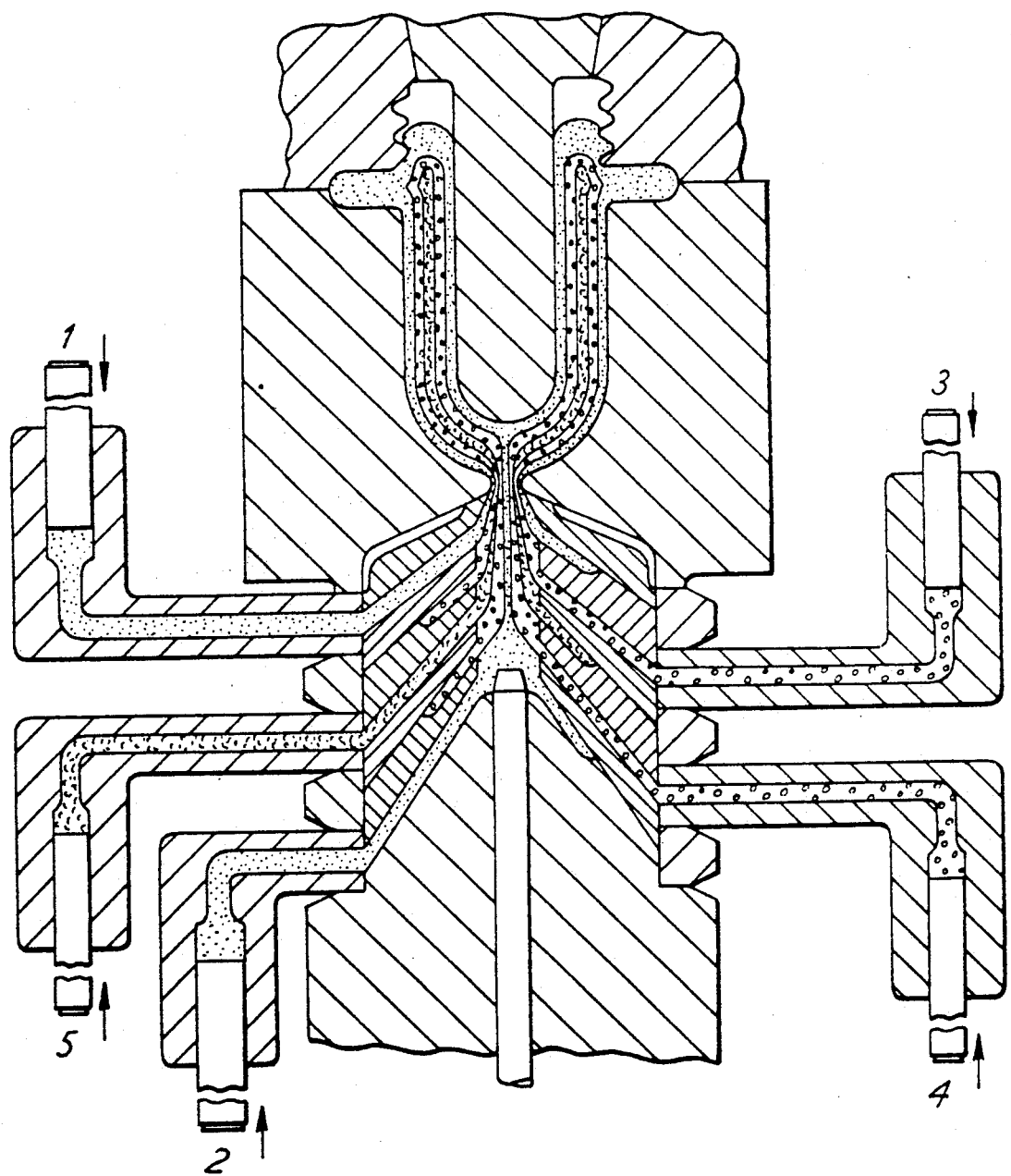

FIG. 17 shows the state: FILL PART WALL; in which the valve pin 74 is fully withdrawn, the valve orifice 72 is open, and all of the injectors have their pistons moving forward to inject further skin, tie and barrier materals into the mould cavity in the manner shown.

Figure 18:
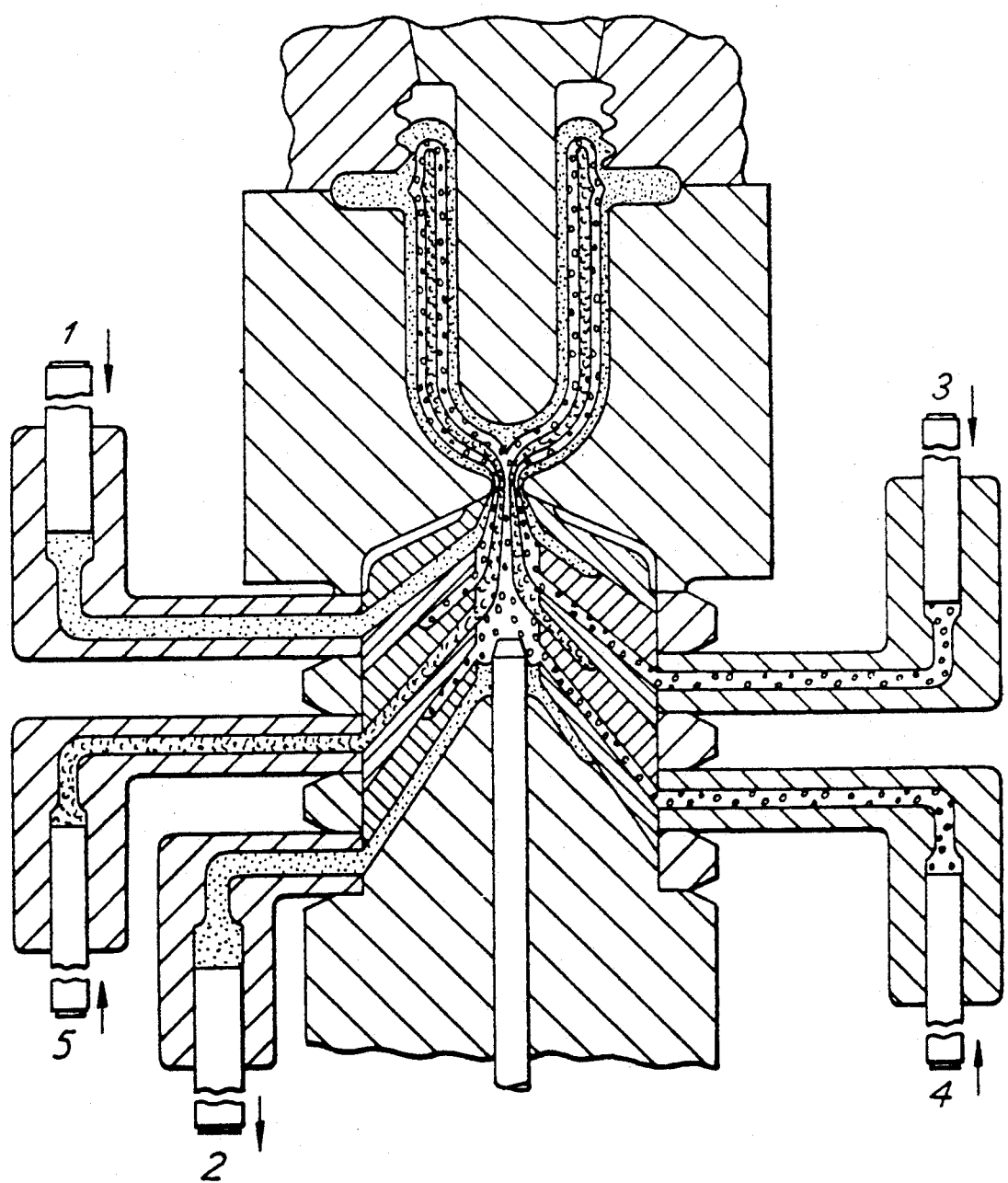

FIG. 18 shows the state: SEAL GATE I; in which the valve pin 74 has moved forward to substantially close off the lowest annular passage 194, the valve orifice 72 is open, the injectors 1, 3, 4 and 5 have their pistons still moving forward, and the injector 2 has its piston starting to reverse so as to suck back and discontinue temporarily the supply of inner skin material in the manner shown.

Figure 19:
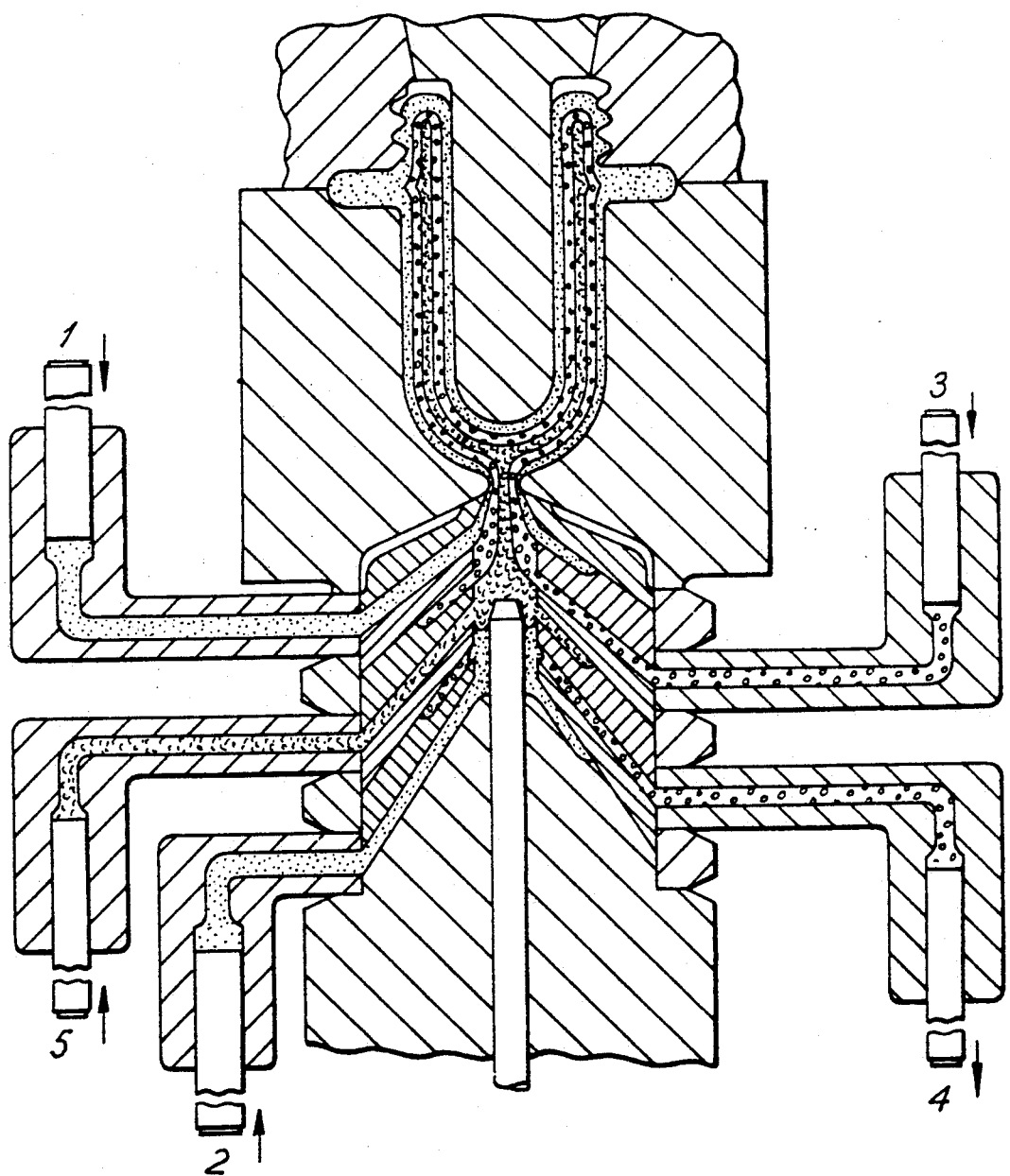

FIG. 19 shows the state: SEAL GATE II; in which the valve pin 74 has moved still further forward so as to close off the next annular passage 182 at the annular port 188, the valve orifice 72 is open, the injectors 1, 3 and 5 have their pistons still moving forward, the injector 4 has its piston starting to reverse so as to suck back and discontinue the supply of inner tie material in the manner shown, and the injector 2 has its piston starting to move forward slowly so as to supply further inner skin material for purging the central annular duct in readiness for the commencement in due course of the next moulding cycle.

Figure 20:
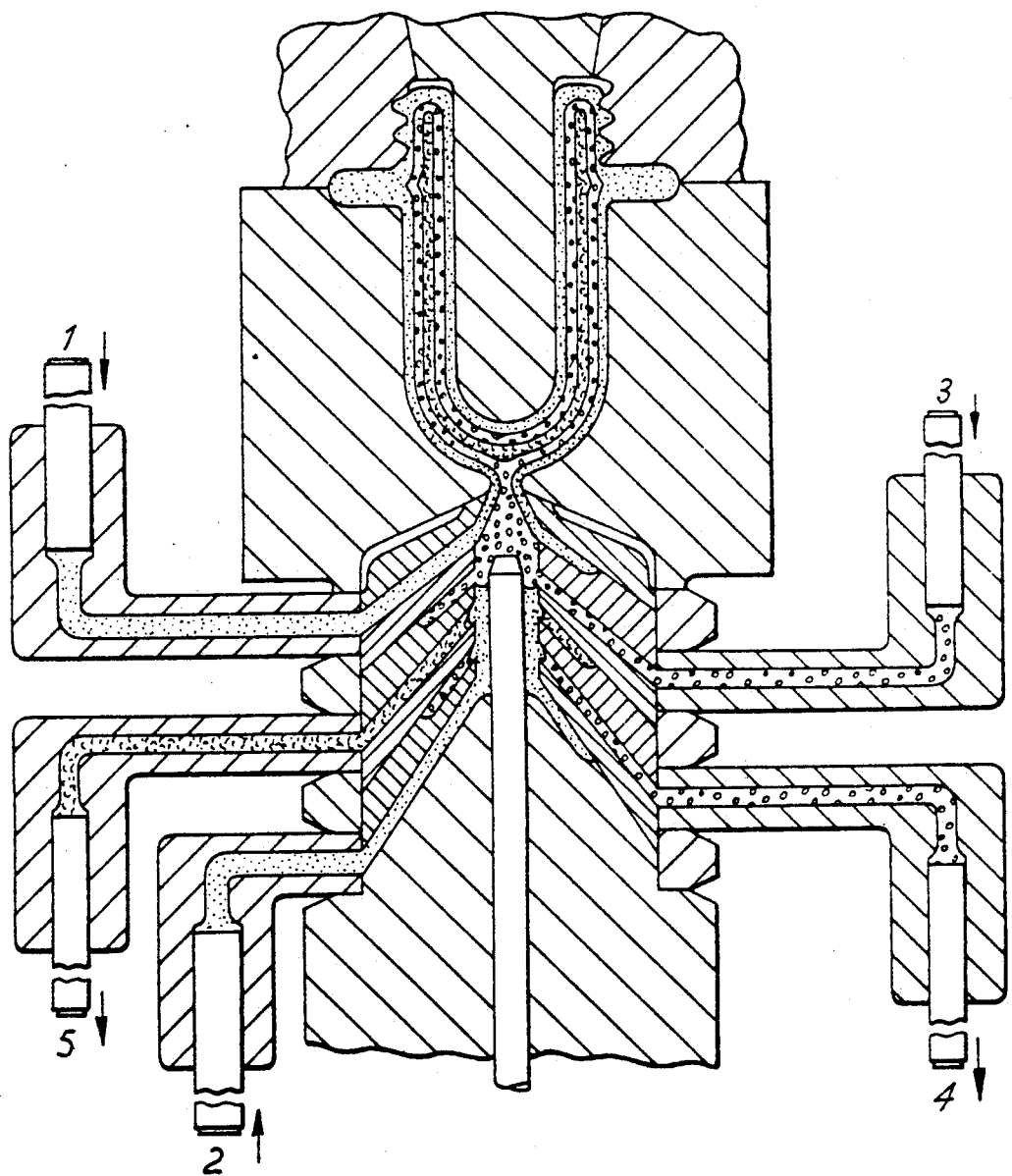

FIG. 20 shows the state: SEAL GATE III; in which the valve pin 74 has moved still further forward so as to substantially close off the next annular passage 180 at the annular port 186, the valve orifice 72 is open, the injectors 1 and 3 have their pistons still moving forward, the injectors 4 and 5 have their pistons starting to reverse so as to suck back and dicontinue the supply of inner tie and barrier materials, and the injector 2 has its piston starting to move forward slowly so as to supply further inner skin material for purging the central annular duct in readiness for the commencement in due course of the next moulding cycle.

Figure 21:
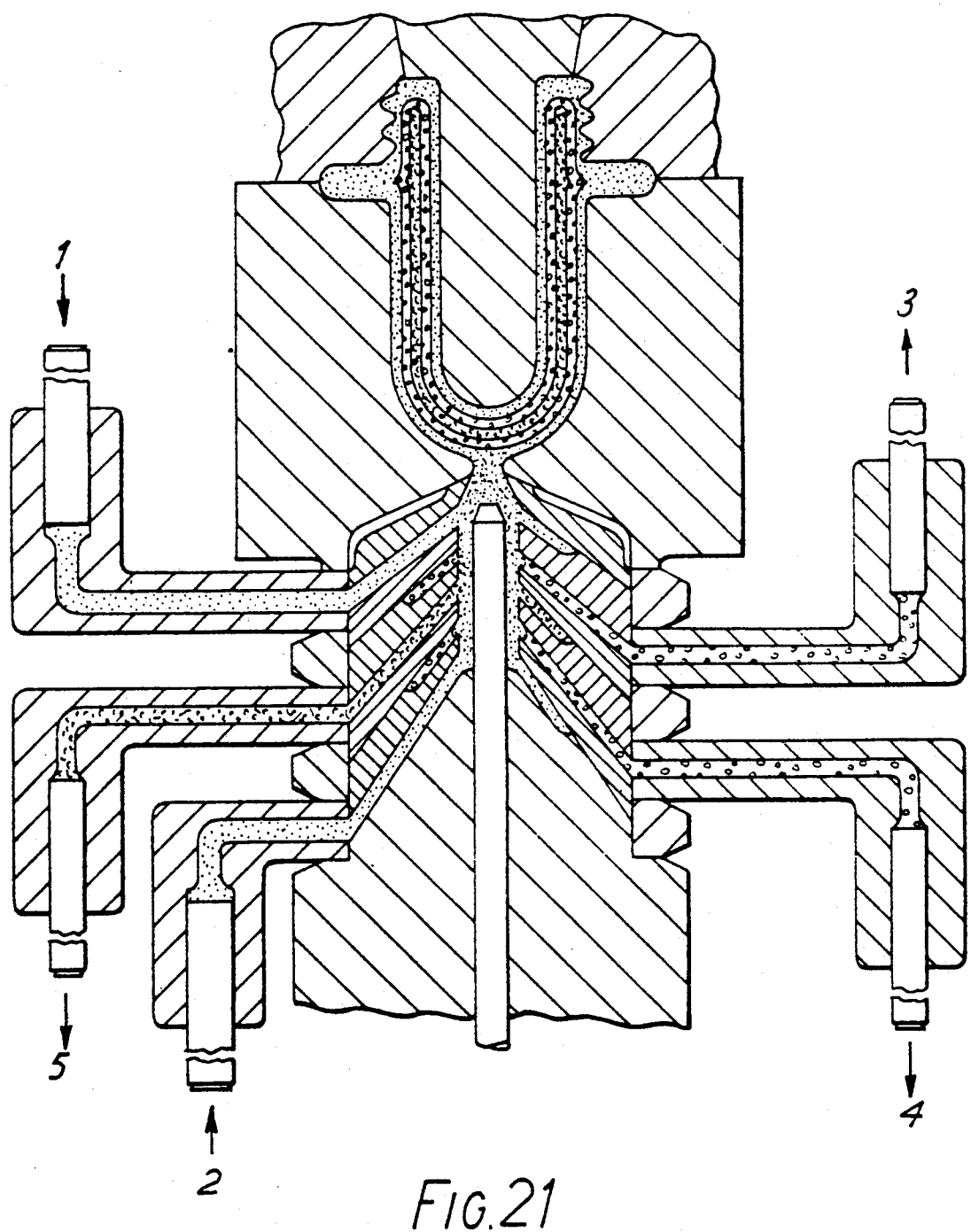

FIG. 21 shows the state: SEAL GATE IV-INJECTOR HOLD; in which the valve pin 74 has moved still further forward so as to substantially close off the next annular passage 178 at the annular port 184, the valve orifice 72 is open, the injectors 4 and 5 continue to suck back inner tie and barrier materials, the injuector 3 has its piston starting to reverse so as to suck back and discontinue the supply of outer tie material, and the injectors 1 and 2 have their pistons driven slowly forward as required to complete the filling of the outer skin and make up for shrinkage as it occurs in the materials being cooled in the mould cavity.

The sequence ends with the further advancement of the valve pin 74 so as to seal the gate orifice 72, and so return the assembly to state shown in the FIG. 13 in readiness for the next moulding cycle. In that condition, the injector 2 has supplied sufficient inner skin material to purge the central annular duct of the barrier and inner and outer tie materials.

The injector sequence and fill rate are precisely controlled by the respective injection units which operate under the pre-programmed control of the module micro-processor 164 so as to achieve optimum quality of the moulded product.

During the injection sequence, the polymer pressures in the respective transfer plate ducts 198-206 rise to approximately 400-600 bar, but the non-return ball valves 220 prevent polymer back-flow along the intermediate pressure supply pipes 30-34 to the respective plasticisers. However, when the polymer pressure in any transfer plate duct falls below the intermediate pressure provided the plasticisers, that is, when the injector pistons withdraw to take in a fresh charge of polymer material, the ball valve permits the flow of such material from the plasticiser into the injector cylinder.

It should be noted that the close proximity of the injection units to the co-injection nozzle unit, and the use of a discrete stored module injection control programme render it unnecessary to provide additional valves for controlling the respective polymer melt streams at or adjacent to the co-injection nozzle unit.

At the end of the mould filling (packing) stage, the valve pin 74 closes the valve gate orifice 72, and signals the start of the product ejection sequence. During the ejection sequence, the injector cylinders are refilled with polymer material from the respective heated supply pipes 30-34, the injector pistons being forced back by the incoming polymer material at the said intermediate pressure to their respective pre-programmed starting positions in readiness for the start of the next moulding cycle.

During the ejection sequence, the movable portion 62 of the module is raised by the micro-processor controlled operation of the mould-clamping actuator 80, 84 whereby to raise the turret 94 and extract the core member 100 and the moulded product 102 from the mould assemblies 76 and 108.

During the initial upward movement of the core member, disc springs 221 (FIG. 4) in the movable mould member 110 cause the mould separation pins 112 to separate the movable member 110 and its associated neck-forming, split mould 116 from the fixed, body-forming mould body 76, and so break the moulded product from the cavity of the fixed mould body 76. As the upward movement of the turret and its core member continues, the transverse compression springs 120 separate the split mould parts 118 and allow the moulded product to be lifted clear of the split mould assembly 108.

At the uppermost position of the movable portion 62, the indexing means 104 rotates the turret 94 and each core member 100 through an angle of ninety degrees, thus presenting a fresh core member to the mould assemblies, holding the just-moulded product in an intermediate cooling position, and presenting a cooled moulded product 102 to the stripper and handling units 124, 128 for further cooling on the cooling rail 133 and eventual delivery to the product collection conveyor 134.

The turret is then locked against further rotation, and the stripper and handling units grip the cooled moulded product now presented to them.

The hydraulic actuator 80, 84 now lowers the movable portion 62 of the module whereby to lower the turret towards the mould assemblies and to advance the fresh core member 100 into those mould assemblies. When the associated turret arm 95 contacts the split mould 116, that mould and its carrier member 110 move down into firm contact with the mould body 76.

The descent of the turret causes the cooled product 102 to be stripped from the core member on which it was moulded. During the course of the next moulding sequence, the turnover device 128 rotates that product through an angle of 180 degrees and presents it to the cooling rail 133. The pusher device 132 thereupon nudges that product and others in front of it along the cooling rail, from which they eventually fall on to the circular vibratory conveyor 134. The turret indexing means 104 and the turnover device 128 then reset to their respective initial conditions in readiness for the next product handling cycle.

In the above described apparatus, each newly-moulded product 102 is removed from the mould cavity whilst still in a hot 'rubbery' condition, and is cooled during the whole of the next moulding cycle before being presented for stirring and subsequent handling.

If desired, in each injector 208, the piston 212 may have its active end face inclined to the axis of movement of the piston.

To enable a module to be taken out of commission, the respective cut-off valves 27-29 in the respective manifolds 24-26 are operated to their isolating positions.

The polymer transfer plates are preferably pressure-cast in beryllium copper.

Whilst the control of all of the operations within the module is exercised by the module micro-processor 164, those micro-processors are subject themselves to the control of a 'host' micro-processor (see FIG. 13), which supervises the overall control of the apparatus 10 and operates, inter alia and for example, so as to optimise the speed and use of the plasticisers, whilst avoiding overloading them.

Whilst the apparatus described above uses single cavity injection moulds, it is anticipated that with careful design the apparatus may used with two (or even more) cavity moulds.

Moreover, whilst the above described apparatus is directed to co-injection of multi-layer articles, the principles of the present invention may also be applied to the injection moulding of single-layer articles. Thus, a module 12 may be controlled by its micro-processor to use only one of its injectors 208 so as to produce by appropriate control of the valve pin 74 and the injector a moulded article using only one layer of the skin material. In like manner, the modules may be programmed to produce, as required, other articles having other numbers of layers, using only the valve pin and injector controls necessary for producing the desired articles.

Furthermore, each module or some of the modules may be extended for the production of, for example, seven layer articles, by the addition in the or each nozzle assembly of additional nozzle elements and additional polymer transfer plates, and of additional injectors; by the addition in the common part of the apparatus of additional plasticisers; and by the provision of an appropriate stored injection program for the or each module micro-processor, all as appropriate to the particular article to be produced.

The use of a stored injection control program which is unique to the particular module permits the production simultaneously by the apparatus of articles which are of different constructions, and of articles having different numbers of layers.

In the present invention, control of the temperature and flow rate of each individual polymer material as it flows through the associated plasticiser, supply pipe, injector, transfer duct, nozzle passageway and gate valve orifice into the mould cavity is achieved in all such parts by appropriate control action of the module micro-processor 164, operating in accordance with the stored module control program, to energise respective heating means associated with those parts. Such controlled temperatures and flow rates are normally different for each such polymer material, and may vary from module to module. This aspect constitutes an important feature of the present invention.

It should also be appreciated that the small volume of each individual polymer flow path between the injector and the gate valve orifice 72 enables a precise control of the flow of polymer material to be achieved solely by exercising a position control of the injector piston, and without the interposition of any additional valve mechanism adjacent the nozzle assembly. This further aspect also constitutes another important feature of the present invention.

Whilst the valve pin 74 operates primarily as a means of opening and closing the gate valve orifice 72 which leads into the mould cavity 78, it acts secondarily as a means of exercising control of the velocity of the respective flows of polymer materials as they move towards that valve orifice under the mass flow control of the respective injectors 208. That valve pin does not act as an on/off valve, nor as a variable flow valve controlling the size of the respective mass flows of the respective polymer materials. The injectors control the mass flow rates of those materials. This further aspect also constitutes another important feature of the present invention.

In the specific embodiment described above, the radial clearance between the valve pin 74 and each opposed nose portion 172 of a nozzle element amounts to ½ mm. In other embodiments that radial clearance may be greater (or even smaller), depending on the purpose and the design of the nozzle assembly.

Whilst in the above described embodiment each injector has been connected to supply polymer material to a single transfer duct (198-206) and its associated annular nozzle passageway (176, 178-192, 194), in appropriate cases and by careful design it may be possible, without substantially impairing the functioning of the system-but with great saving in cost, to use one injector for supplying the same polymer material (e.g. an adhesive material) to two of the transfer ducts and their associated nozzle passageways.

In the cited prior patent publication EP 0125787 A2, the apparatus there disclosed (a) has a highly complex system of valving disposed between the gate valve orifice and the respective injectors for controlling the respective flows of the respective polymer materials to that orifice, and (b) employs an arrangement which does not lend itself to the individual control of the respective temperatures of all of the respective elements that constitute a polymer flow system.

In contrast, the apparatus provided by the present invention has no such complicated array of valving for controlling the flows into the nozzle assembly, and moreover has a plurality of simple polymer flow systems each of which has an individual temperature control system associated with it for maintaining a temperature appropriate to the particular polymer material being carried by the flow system. This constitutes an important advantage for the present apparatus.

We are aware of the following patent publications that relate to the technical field of the present invention: U.S. Pat. No. 3,339,240 (Corbett); U.S. Pat. No. 3,707,591 (Chalfont); U.S. Pat. No. 4,035,466 (Langecker); U.S. Pat. No. 4,052,497 (Monnet); U.S. Pat. No. 4,174,413 (Yasuike et al); UK 2118894A (McHenry et al).

It is claimed:

1. A multi-cavity, co-injection molding apparatus comprising:
   (1) a plurality of similar modules, each of which comprises:
       (a) a polymer injection mold defining an injection molding cavity;
       (b) a co-injection nozzle incorporating a gate opening in communication with said mold cavity, and a polymer flow chamber extending from said gate opening and defined by an annular chamber wall;
       (c) an elongate gate member slidably supported for longitudinal movement in said nozzle and extending through said polymer flow chamber with uniform circumferential clearance from said chamber wall, said gate member defining at one end thereof a gate valve adapted for entering said gate opening thereby to close said gate opening, and said clearance providing a path for polymer flowing through said flow chamber to said gate opening;
       (d) a gate actuator connected to said gate member and adapted for alternative activation thereby to move said gate member axially alternatively in a direction to cause said gate valve to enter and thereby close said gate opening, or in an opposite direction to withdraw said gate valve and thereby open said gate opening;
       (e) at least two polymer flow ducts formed in said nozzle, each said duct having an inlet end and an outlet end, said outlet end defines an annular port opening into said polymer flow chamber at said chamber wall, said ports encircling said gate member and being spaced axially apart;
       (f) at least two polymer injectors, each having respective injector polymer outlet and inlet ducts and a movable injector ram;
       (g) respective connecting means connecting the respective injector polymer outlet ducts with the respective inlet ends of said polymer flow ducts of said nozzle;
       (h) respective non-return valves connected respectively to the respective injector polymer inlet ducts, thereby to prevent the back-flow of polymer from the injectors;
       (i) first and second polymer inlet pipes connected to the respective non-return valves;
       (j) respective injector actuators drivingly connected to the respective injector rams and
       (k) respective injector control means connected to the respective injector actuators and adapted to control the positions of the respective injector rams according to respective predetermined ram position-time cycles;
   (2) at least two polymer supply manifolds, each having a plurality of outputs and a single input;
   (3) a first set of polymer distribution pipes connecting the respective outputs of a first one of said polymer supply manifolds with the respective first polymer inlet pipes of the respective modules;
   (4) a second set of polymer distribution pipes connecting the respective outputs of a second one of said polymer supply manifolds with the respective second polymer inlet pipes of the respective modules;
   (5) a first polymer plasticizer connected to the input of said first polymer supply manifold and adapted to supply a first hot polymer to said first polymer supply manifold continuously;
   (6) a second polymer plasticizer connected to the input of said second polymer supply manifold and adapted to supply a second hot polymer to said second polymer supply manifold continuously; and
   (7) respective heating means for maintaining the respective polymers at their respective working temperatures during their passage from the respective plasticizers to the respective injection molding cavities;

whereby in each said module, said first hot polymer is supplied by one said injector to one said port in said co-injection nozzle, and said second hot polymer is supplied by the other said injector to the other port in said co-injection nozzle.

2. Apparatus according to claim 1 wherein in each module, said injectors are so disposed that their respective injector rams move in directions that are parallel with the direction of said longitudinal movement of said gate member.

3. Apparatus according to claim 1 wherein in each said module, said polymer flow ducts in said co-injection nozzle are disposed radially relative to said direction of longitudinal movement of said gate member, and the respective connecting means are likewise radially disposed and are of minimal length.

4. Apparatus according to claim 1 wherein in each said module, said injectors are clustered around said co-injection nozzle at angularly spaced positions, and are so disposed that their respective rams move in directions that are parallel with said direction of longitudinal movement of said gate member.

5. A multi-cavity, co-injection molding apparatus comprising:
 (1) a plurality of similar modules, each of which comprises:
  (a) a polymer injection mold defining an injection molding cavity;
  (b) a co-injection nozzle incorporating a gate opening in communicating with said molding cavity, and a polymer flow chamber extending from said gate opening and defined by an annular chamber wall;
  (c) an elongate gate member slidably supported for longitudinal movement in said nozzle and extending through said polymer flow chamber with uniform circumferential clearance from said chamber wall, said gate member defining at one end thereof a gate valve adapted for entering said gate opening thereby to close said gate opening, and said clearance providing a path for polymer flowing through said flow chamber to said gate opening;
  (d) a gate actuator connected to said gate member and adapted for alternative actuation thereby to move said gate member axially alternatively in a direction to cause said gate valve to enter and thereby close said gate opening, or in an opposite direction to withdraw said gate valve and thereby open said gate opening;
  (e) three polymer flow ducts formed in said nozzle, each said duct having an inlet end and an outlet end, said outlet end defines an annular port opening into said polymer flow chamber at said chamber wall, said ports encircling said gate member, beign spaced axially apart, and constituting a central port and respective outer ports spaced on either side of said central port;
  (f) three polymer injectors, each having respective injector polymer outlet and inlet ducts and a movable injector ram;
  (g) respective connecting means connecting the respective injector polymer outlet ducts with the respective inlet ends of said polymer flow ducts of said nozzle;
  (h) respective non-return valves connected respectively to the respective injector polymer inlet ducts, thereby to prevent the back-flow of polymer from the injectors;
  (i) first, second and third polymer inlet pipes connected to the respective non-return valves;
  (j) respective injector actuators drivingly connected to the respective injector rams; and
  (k) respective injector control means connected to the respective injector actuators and adapted to control the positions of the respective injector rams according to respective predetermined ram position-time cycles;
 (2) two polymer supply manifolds, each having a plurality of outputs and a single input;
 (3) a first set of polymer distribution pipes connecting the respective outputs of a first one of said polymer supply manifolds with the respective first and third polymer inlet pipes of the respective modules;
 (4) a second set of polymer distribution pipes connecting the respective outputs of a second one of said polymer supply manifolds with the respective second polymer inlet pipes of the respective modules;
 (5) a first polymer plasticizer connected to the input of said first polymer supply manifold and adapted to supply a first hot polymer to said first polymer supply manifold continuously;
 (6) a second polymer plasticizer connected to the input of said second polymer supply manifold and adapted to supply a second hot polymer to said second polymer supply manifold continuously; and
 (7) respective heating means for maintaining the respective polymers at their respective working temperatures during their passage from the respective plasticizers to the respective injection molding cavities;

whereby in each said module, said first hot polymer is supplied by respective injectors to said outer ports in said co-injection nozzle, and said second hot polymer is supplied by one said injector to said central port in said co-injection nozzle.

6. Apparatus according to claim 5 wherein in each module, said injectors are so disposed that their respective injector rams move in directions that are parallel with the direction of said longitudinal movement of said gate member.

7. Apparatus according to claim 5 wherein in each said module, said polymer flow ducts in said co-injection nozzle are disposed radially realtive to said direction of longitudinal movement of said gate member, and the respective connecting means are likewise radially disposed and are of minimal length.

8. Apparatus according to claim 5 wherein in each said module, said injectors are clustered around said co-injection nozzle at angularly spaced positions, and are so disposed that their respective rams move in directions that are parallel with said direction of longitudinal movement of said gate member.

9. A multi-cavity, co-injection molding apparatus comprising:
 (1) a plurality of similar modules, each of which comprises:
  (a) a polymer injection mold defining an injection molding cavity;
  (b) a co-injection nozzle incorporating a gate opening in communication with said molding cavity, and a polymer flow chamber extending from said gate opening and defined by an annular chamber wall;

(c) an elongate gate member slidably supported for longitudinal movement in said nozzle and extending through said polymer flow chamber with uniform circumferential clearance from said chamber wall, said gate member defining at one end thereof a gate valve adapted for entering said gate opening thereby to close said gate opening, and said clearance providing a path for polymer flowing through said flow chamber to said gate opening;

(d) a gate actuator connected to said gate member and adapted for alternative actuation thereby to move said gate member axially alternatively in a direction to cause said gate valve to enter and thereby close said gate opening, or in an opposite direction to withdraw said gate valve and thereby open said gate opening;

(e) five polymer flow ducts formed in said nozzle, each said duct having an inlet end and an outlet end, said outlet end defines an annular port opening into said polymer flow chamber at said chamber wall, said ports encircling said gate member, being spaced axially apart, and constituting a central port, two intermediate ports spaced on either side of said central port, and two outer ports spaced respectively outward of said intermediate ports;

(f) five polymer injectors, each having respective injector polymer outlet and inlet ducts and a movable injector ram;

(g) respective connecting means connecting the respective injector polymer outlet ducts with the respective inlet ends of said polymer flow ducts of said nozzle;

(h) respective non-return valve connected respectively to the respective injector polymer inlet ducts, thereby to prevent the back-flow of polymer from the injectors;

(i) first, second, third, fourth and fifth polymer inlet pipes connected to the respective non-return valves;

(j) respective injector actuators drivingly connected to the respective injector rams; and (k) respective injector control means connected to the respective injector actuators and adapted to control the positions of the respective injector rams according to respective predetermined ram position-time cycles;

(2) three polymer supply manifolds, each having a plurality of outputs and a single input;

(3) a first set of polymer distribution pipes connecting the respective outputs of a first one of said polymer supply manifolds with the respective first and fifth polymer inlet pipes of the respective modules;

(4) a second set of polymer distribution pipes connecting the respective outputs of a second one of said polymer supply manifolds with the respective second and fourth polymer inlet pipes of the respective modules;

(5) a third set of polymer distribution pipes connected the respective outputs of a third one of said polymer manifolds with the respective third polymer inlet pipes of the respective modules;

(6) a first polymer plasticizer connected to the input of said first polymer supply manifold and adapted to supply a first hot polymer to said first polymer supply manifold continuously;

(7) a second polymer plasticizer connected to the input of said second polymer supply manifold and adapted to supply a second hot polymer to said second polymer supply manifold continuously;

(8) a third polymer plasticizer connected to the input of said third polymer supply manifold and adapted to supply a third hot polymer to said third polymer supply manifold continuously; and (9) respective heating means for maintaining the respective polymers at their respective working temperatures during their passage from the respective plasticizers to the respective injection molding cavities;

whereby in each said module, said first hot polymer is supplied by respective injectors to said outer ports in said co-injection nozzle, said second hot polymer is supplied by respective injectors to said intermediate ports in said co-injection nozzle, and said third hot polymer is supplied by one said injector to said central port in said injection nozzle.

10. Apparatus according to claim 9 wherein in each module, said injectors are so disposed that their respective injector rams move in directions that are parallel with the direction of said longitudinal movement of said gate member.

11. Apparatus according to claim 9 wherein in each said module, said polymer flow ducts in said co-injection nozzle are disposed radially relative to said direction of longitudinal movement of said gate member, and the respective connecting means are likewise radially disposed and are of minimal length.

12. Apparatus according to claim 9 wherein in each said module, said injectors are clustered around said co-injection nozzle at angularly spaced positions, and are so disposed that their respective rams move in directions that are parallel with said direction of longitudinal movement of said gate member.

* * * * *

UNITED STATES PATENT AND TRADEMARK OFFICE
CERTIFICATE OF CORRECTION

PATENT NO. : 5,028,226

DATED : July 2, 1991

INVENTOR(S) : R.M. De'ath; B. Fairchild, deceased; Ian Flude

It is certified that error appears in the above-identified patent and that said Letters Patent is hereby corrected as shown below:

Column 1, line 47, after "is" change "tha" to -- that --.

Column 1, line 48, change "erquires" to -- requires --.

Column 1, line 53, move the text at column 13, lines 52-58, to column 1, line 53, and begin a new paragraph as) follows:

-- We are aware of the following patent publications that relate to the technical field of the present invention: U.S. Pat. No. 3,339,240 (Corbett); U.S. Pat. No. 3,707,591 (Chalfont); U.S. Pat. No. 4,035,466 (Langecker); U.S. Pat. No. 4,052,497 (Monnet); U.S. Pat. No. 4,174,413 (Yasuike et al); UK 2118894A (McHenry et al). --.

Column 1, line 65, after "with" delete "a".

Column 2, line 34, after "device" change "transfer" to -- transfers --.

Column 2, line 46, change "conrol" to -- control --.

Column 4, line 50, change "FIGs." to -- FIGS. --.

Column 6, line 12, change "later" to -- latter --.

Column 7, line 28, change "radal" to -- radial --.

UNITED STATES PATENT AND TRADEMARK OFFICE
CERTIFICATE OF CORRECTION

PATENT NO. : 5,028,226

DATED : July 2, 1991

INVENTOR(S) : R.M. De'ath; B. Fairchild, deceased; Ian Flude

It is certified that error appears in the above-identified patent and that said Letters Patent is hereby corrected as shown below:

Column 7, line 37, change "taht" to -- that --.

Column 8, line 2, delete "the" (second occurrence).

Column 8, line 21, change "communicate" to -- communicates --.

Column 9, line 65, change "materals" to -- materials --.

Column 10, line 25, change "dicontinue" to -- discontinue --.

Column 10, line 36, change "injuector" to -- injector --.

Column 12, line 2, change "stirring" to -- stripping --.

Column 12, line 21, after "may" insert -- be --.

Column 12, line 41, change "plasticers" to -- plasticisers --.

Column 13, line 15, change "alsoconstitutes" to -- also constitutes --.

Column 13, lines 52-58, delete lines 52-58.

UNITED STATES PATENT AND TRADEMARK OFFICE
CERTIFICATE OF CORRECTION

PATENT NO. : 5,028,226

DATED : July 2, 1991

INVENTOR(S) : R.M. De'ath; B. Fairchild, deceased; Ian Flude

It is certified that error appears in the above-identified patent and that said Letters Patent is hereby corrected as shown below:

In the Claims

Column 15, line 59, change "beign" to -- being --.

Column 16, line 50, change "realtive" to -- relative --.

Column 17, line 37, after "non-return" change "valve" to -- valves --.

Column 18, line 8, after "pipes" change "connected" to -- connecting --.

Signed and Sealed this

First Day of June, 1993

Attest:

MICHAEL K. KIRK

*Attesting Officer*   *Acting Commissioner of Patents and Trademarks*